US008180700B1

(12) United States Patent  (10) Patent No.: US 8,180,700 B1
Arnold et al.  (45) Date of Patent: May 15, 2012

(54) TRANSACTION SYSTEM FOR EMPLOYEE STOCK OPTIONS AND OTHER COMPENSATION PROGRAMS

(75) Inventors: Caroline L. Arnold, New York, NY (US); Raghavachari Madhavan, New York, NY (US); Chris Kovel, Montclair, NJ (US); Lynn M. Riehl, Stamford, CT (US); Andrew Sargison, Harpenden (GB); Ben Johnson-Laird, New York, NY (US); Yimei Guo, Lake Grove, NY (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 13/087,634

(22) Filed: Apr. 15, 2011

Related U.S. Application Data

(63) Continuation of application No. 11/607,552, filed on Dec. 1, 2006, now abandoned.

(51) Int. Cl.
  *G06Q 40/00* (2012.01)
(52) U.S. Cl. ............................................. 705/37; 705/35
(58) Field of Classification Search ................ 705/35–37
  See application file for complete search history.

(56) References Cited

U.S. PATENT DOCUMENTS

| 5,262,942 | A * | 11/1993 | Earle ................................ 705/37 |
| 6,161,095 | A | 12/2000 | Brown |
| 6,173,270 | B1 | 1/2001 | Cristofich et al. |
| 6,269,346 | B1 | 7/2001 | Cristofich et al. |
| 6,567,790 | B1 | 5/2003 | Slane |
| 6,609,111 | B1 | 8/2003 | Bell |
| 6,618,707 | B1 | 9/2003 | Gary |
| 6,629,082 | B1 | 9/2003 | Hambrecht et al. |
| 7,177,833 | B1 | 2/2007 | Marynowski et al. |
| 7,200,571 | B1 * | 4/2007 | Jenniges et al. ................ 705/37 |
| 7,337,141 | B2 | 2/2008 | Sullivan et al. |
| 2001/0034692 | A1 | 10/2001 | McRedmond |
| 2001/0056391 | A1 | 12/2001 | Schultz |
| 2002/0032636 | A1 | 3/2002 | Shields et al. |
| 2002/0035534 | A1 | 3/2002 | Buist et al. |
| 2002/0042771 | A1 | 4/2002 | Shields et al. |
| 2002/0169706 | A1 | 11/2002 | Chandra et al. |
| 2002/0169711 | A1 | 11/2002 | Ginsberg et al. |
| 2002/0194136 | A1 | 12/2002 | Sullivan et al. |
| 2003/0083979 | A1 * | 5/2003 | Walker et al. .................... 705/37 |
| 2003/0105698 | A1 | 6/2003 | Gusler et al. |
| 2003/0144888 | A1 | 7/2003 | Baron et al. |
| 2003/0233307 | A1 | 12/2003 | Salvadori et al. |

(Continued)

OTHER PUBLICATIONS

Akresh et al., "Consider Your Options (Carefully)," Financial Executive, Nov./Dec. 1995, vol. 11, No. 6, 3 pages.

(Continued)

*Primary Examiner* — Narayanswamy Subramanian
*Assistant Examiner* — Ryan D Donlon
(74) *Attorney, Agent, or Firm* — K&L Gates LLP

(57) ABSTRACT

Systems and methods of selling employee stock options (ESOs) and other compensation instruments. The method may comprise receiving a sale order for the employee stock options from a seller. The method may also comprise the step of determining a winning bidder based on bids submitted by at least two bidders that specify a price for the employee stock options. The method may further comprise suspending the auction until there are qualifying bids from at least two bidders. The method may also comprise transferring a derivative in place of the employee stock options to the winning bidder, wherein the derivative entities the holder thereof to buy a quantity of securities of an issuer at the price.

22 Claims, 21 Drawing Sheets

ORDERS FOR STRIKE PRICE AT $350
ORDER QUEUE: 1. 800 OPTIONS, 2. 500 OPTIONS, 3. 400 OPTIONS

| TIME: | 9:30:01 AM EST | 9:30:02 AM EST | 9:30:06 AM EST | 9:30:08 AM EST | 9:30:09 AM EST | 9:31:00 AM EST |
|---|---|---|---|---|---|---|
| ORDER QUEUE @ STRIKE PRICE: $350 | ORDER 1: 800 OPTIONS @ $350 | ORDER 2: 500 OPTIONS @ $350 | ORDER 2: 500 OPTIONS @ $350 | ORDER 3: 400 OPTIONS @ $350 | WAITING FOR ORDER | WAITING FOR ORDER |
| BIDDERS: (#OPTIONS/ PRICE PER OPTION) | | | | | | |
| BIDDER 1: | 1000 / $100 | 200 / $100 | 1000 / $98 | 1000 / $99 | 1000 / $99 | 1000 / $100 |
| BIDDER 2: | 1000 / $90 | 1000 / $90 | 1000 / $93 | 1000 / $103 | 600 / $103 | 1000 / $100 |
| BIDDER 3: | 1000 / $99 | 1000 / $102 | 1000 / $102 | 500 / $102 | 500 / $102 | 1000 / $95 |
| RESULT: | BIDDER 1 WINS AUCTION 1: 800 OPTIONS WHICH ARE DEDUCTED FROM BIDDER 1'S OFFER. | NO BIDDER WINS AUCTION 2: MUST WAIT FOR BIDDER 1 TO REFRESH AS THERE AREN'T ENOUGH OPTIONS ON OFFER BY ALL BIDDERS TO FILL THE ORDER. | BIDDER 3 WINS AUCTION 2: 500 OPTIONS ARE DEDUCTED FROM BIDDER 3'S OFFER. | BIDDER 2 WINS AUCTION 3: 400 OPTIONS ARE DEDUCTED FROM BIDDER 2'S OFFER. | WAITING FOR AN AUCTION. AN AUCTION FOR 500 OPTIONS OR LESS COULD HAVE BEEN EXECUTED AT THIS TIME IF ONE WAS IN THE QUEUE. | STILL WAITING FOR AN AUCTION. |

U.S. PATENT DOCUMENTS

| | | |
|---|---|---|
| 2004/0039676 A1 | 2/2004 | Trainer |
| 2004/0039685 A1 | 2/2004 | Hambrecht et al. |
| 2004/0059666 A1 | 3/2004 | Waelbroeck et al. |
| 2004/0103053 A1 | 5/2004 | Rudkin |
| 2004/0117283 A1 | 6/2004 | Germack |
| 2004/0128217 A1 | 7/2004 | Feriedman et al. |
| 2004/0128221 A1 | 7/2004 | Pandher |
| 2004/0138978 A1 | 7/2004 | Zhang et al. |
| 2004/0138979 A1 | 7/2004 | Juhre et al. |
| 2004/0172349 A1 | 9/2004 | Quinn et al. |
| 2004/0177016 A1 | 9/2004 | Jones et al. |
| 2004/0199449 A1 | 10/2004 | Rudkin |
| 2004/0254804 A1 | 12/2004 | Peterffy et al. |
| 2004/0267656 A1 | 12/2004 | Friedman et al. |
| 2005/0004832 A1 | 1/2005 | Ostergard et al. |
| 2005/0004854 A1 | 1/2005 | Jones et al. |
| 2005/0010518 A1 | 1/2005 | Friedman et al. |
| 2005/0010613 A1* | 1/2005 | Lejdstrom et al. ............ 707/201 |
| 2005/0021435 A1 | 1/2005 | Hakanoglu et al. |
| 2005/0114242 A1 | 5/2005 | Gray et al. |
| 2005/0192875 A1 | 9/2005 | White et al. |
| 2005/0209949 A1 | 9/2005 | Le Guyader |
| 2005/0267839 A1 | 12/2005 | Ortner |
| 2006/0036351 A1 | 2/2006 | Hopkins |
| 2006/0080218 A1 | 4/2006 | Seaman et al. |
| 2006/0085319 A1 | 4/2006 | Rishi et al. |
| 2006/0155621 A1 | 7/2006 | Bell |
| 2006/0184446 A1 | 8/2006 | Ross |
| 2006/0212377 A1 | 9/2006 | Smith et al. |
| 2007/0016514 A1 | 1/2007 | Al-Abdulqader et al. |
| 2007/0022035 A1 | 1/2007 | Seaman et al. |
| 2007/0022038 A1 | 1/2007 | Seaman et al. |
| 2007/0022041 A1 | 1/2007 | Durkin et al. |
| 2007/0136181 A1 | 6/2007 | Miller |
| 2007/0219898 A1* | 9/2007 | Burkhardt et al. .............. 705/37 |
| 2008/0306865 A1* | 12/2008 | Evelyn et al. .................. 705/37 |
| 2011/0313908 A1* | 12/2011 | Schluetter et al. ............. 705/37 |

OTHER PUBLICATIONS

Bliss, "Common Sense About Executive Stock Options", Chicago Fed Letter, Apr. 2003, No. 188, 4 pages.

Brozovsky et al., "Accounting for Stock-Based Compensation: SFAS 123," Ohio CPA Journal, Jan.-Mar. 1998, vol. 57, No. 1, 6 pages.

Carpenter, "The Exercise and Valuation of Executive Stock Options," Journal of Financial Economics 48 (1998), 32 pages.

Chance et al., "Black-Scholes, Liquidity, and the Cost of Executive Stock Options," working paper, Louisiana State University, Apr. 2004, 49 pages.

Conner, "eBay: The Missing Manual", Aug. 2005, O'Reilly Media Inc., 2 pages.

Corrado et al., "Repricing and Employee Stock Option Valuation," working paper, School of Business, Columbia College, Mar. 6, 2000, 31 pages.

Crystal, "JP Morgan Creates a New Option for Stock Options," Bloomberg, Dec. 8, 2004, 2 pages.

DeTemple et al., "Nontraded Asset Valuation with Portfolio Constraints: A Binomial Approach," The Review of Financial Studies, Special 1999, vol. 12, No. 4, 38 pages.

Dybvig et al., "Employee Reload Options: Pricing, Hedging, and Optimal Exercise," The Review of Financial Studies, Spring 2003, vol. 16, No. 1, 27 pages.

eBay, "Managing Buying with My eBay", Published on or before Nov. 11, 2005 by eBay.com, Archived by Archive.org, 2 pages.

Financial Accounting Standards Board of the Financial Accounting Foundation, "Statement of Financial Accounting Concepts No. 7, Using Cash Flow Information and Present Value in Accounting Measurements", Feb. 2000, 53 pages.

Financial Accounting Standards Board of the Financial Accounting Foundation, Standards No. 123, "Accounting for Stock-Based Compensation", Oct. 1995, 54 pages.

Financial Accounting Standards Board of the Financial Accounting Foundation, "Financial Accounting Series, Statement of Financial Accounting Standards No. 123 (revised 2004) Share-Based Payment", No. 263-C, Dec. 2004, 295 pages.

Henderson, "Optimal Compensation and Incentives," working paper, Princeton University, Jul. 2003, 36 pages.

Heston, "A Closed-Form Solution for Options with Stochastic Volatility with Applications to Bond and Currency Options," The Review of Financial Studies, 1993, vol. 6, No. 2, 17 pages.

Huddart et al., "Employee Stock Option Exercises: An Empirical Analysis," Journal of Accounting & Economics, Feb. 1996, vol. 21, No. 1, 1 page.

Hull et al., "Determining the Value of Employee Stock Options," Report Produced for the Ontario Teachers Pension Plan, Aug. 2002, 16 pages.

Hull et al., "How to Value Employee Stock Options," Financial Analysts Journal, Jan./Feb. 2004, vol. 60, No. 1, 8 pages.

"Internet Auction Guidelines", Published on or before Apr. 5, 2003 by SellingCattle.com, Archived by Archive.org, 3 pages.

Kulatilaka et al., "Valuing Employee Stock Options," Financial Analysts Journal, Nov./Dec. 1994, vol. 50, No. 6, 11 pages.

Maines et al., "Evaluation of the IASB's Proposed Accounting and Disclosure Requirements for Share-Based Payment," Accounting Horizons, Mar. 2004, vol. 18, No. 1, 8 pages.

Meulbroek, "The Efficiency of Equity-Linked Compensation: Understanding the Full Cost of Awarding Executive Stock Options," working paper, Harvard Business School, 2000, 47 pages.

Meulbroek, "The Efficiency of Equity-Linked Compensation: Understanding the Full Cost of Awarding Executive Stock Options," Financial Management, Summer 2001, vol. 30, No. 2, 13 pages.

Murphy, "Explaining Executive Compensation: Managerial Power Versus the Perceived Cost of Stock Options," University of Chicago Law Review, Summer 2002, vol. 69, No. 3, 15 pages.

Nagy et al., "Accounting for Stock-Based Compensation," Ohio CPA Journal, Dec. 1996, vol. 55, No. 4, 6 pages.

Saly et al., "Valuing the Reload Features of Executive Stock Options," Accounting Horizons, Sep. 1999, vol. 13, No. 3, 10 pages.

Samples, "A Note on the Existence of Starting Point Bias in Iterative Bidding Games", 1985, Western Journal of Agricultural Economics, vol. 10, 9 pages.

Sinnett, "Yes, Employee Stock Options Can Be Valued," Financial Executive, Mar./Apr. 2003, vol. 19, No. 2, 5 pages.

Soffer, "SFAS No. 123 Disclosures and Discounted Cash Flow Valuation," Accounting Horizons, Jun. 2000, vol. 14, No. 2, 13 pages.

Tirinnanzi, "Expensing Stock Options: New Mandates and Old Issues," AFP Exchange, vol. 23, No. 4, Jul./Aug. 2003, 5 pages.

Winkler et al., "Valuation of Options in Heston's Stochastic Volatility Model Using Finite Element Models," Foreign Exchange Risk, Risk Publications, London 2001, 24 pages.

U.S. Appl. No. 10/644,673, filed Aug. 20, 2003, by Woodruff et al., entitled: "Systems and Methods for Realizing Value from Employee Stock Options."

U.S. Appl. No. 11/126,893, filed May 11, 2005, by Madhavan et al., entitled: "Systems and Methods for Compiling and Analyzing Bids in an Auction of Securities."

U.S. Appl. No. 11/072,088, filed Mar. 4, 2005, by Woodruff, entitled: "Structure for Determining Market Price of Employee Options."

U.S. Appl. No. 11/607,552, filed Dec. 1, 2006, by Arnold et al., entitled: "Transaction System for Employee Stock Options and Other Compensation Programs."

* cited by examiner

MY ACCOUNT:: OVERVIEW

ABC STOCK PRICE $376.2 ↑ +2.07 15-MAY-2006 04:32 PM EDT

SUMMARY

| OPTION GRANT | AWARD DATE | OPTION EXPIRATION | FULL VESTING DATE | STRIKE PRICE | NUMBER OF AVAILABLE OPTIONS | | | AVAILABLE VESTED INTRINSIC VALUE @$376.2 | ESTIMATED OPTION PROCEEDS | | |
|---|---|---|---|---|---|---|---|---|---|---|---|
| | | | | | VESTED | UNVESTED | HELD | | VESTED | UNVESTED | HELD |
| 16 | 11-DEC-2005 | 11-DEC-2015 | 11-DEC-2007 | $300.00 | 0 | 3,000 | 3,000 | - | | $352,050.00 | $352,050.00 |
| 15 | 18-AUG-2005 | 18-AUG-2015 | 18-AUG-2007 | $257.00 | 0 | 2,000 | 2,000 | - | | $320,000.00 | $320,000.00 |
| 14 | 31-JUL-2005 | 31-JUL-2015 | 31-JUL-2007 | $232.00 | 200 | 500 | 700 | $28,840.00 | $36,758.00 | $91,895.00 | $128,653.00 |
| 13 | 31-MAY-2005 | 11-MAY-2015 | 11-MAY-2007 | $215.00 | 600 | 800 | 1,400 | $96,720.00 | $120,432.00 | $160,576.00 | $281,008.00 |
| 12 | 18-APR-2005 | 18-APR-2015 | 18-APR-2007 | $173.00 | 100 | 1,500 | 1,600 | $20,320.00 | $24,375.00 | $365,625.00 | $390,000.00 |
| 11 | 31-MAR-2005 | 31-MAR-2015 | 31-MAR-2007 | $140.00 | 1,300 | 700 | 2,000 | $307,060.00 | $350,645.00 | $193,655.00 | $553,300.00 |
| 10 | 11-DEC-2004 | 11-DEC-2014 | 11-DEC-2006 | $125.00 | 500 | 500 | 1,000 | $125,600.00 | $145,770.00 | $145,770.00 | $291,540.00 |
| 9 | 18-AUG-2004 | 18-AUG-2014 | 18-AUG-2006 | $115.00 | 200 | 0 | 200 | $52,240.00 | $60,572.00 | - | $60,572.00 |

FIG. 6

OVERVIEW | SELL OPTIONS | PENDING ORDERS | ORDER HISTORY

HOME | MY ACCOUNT | ANALYTICS | HELP

MY ACCOUNT: ORDER HISTORY

ORDER STATUS
ALL ▼ — 140

4 ITEMS FOUND, DISPLAYING ALL ITEMS. PAGE 1

| ORDER ID | SUBMITTED | ORDER TYPE | STRIKE PRICE ($) | # OPTIONS | LIMIT PRICE ($) | STATUS | EXECUTED CANCELLED | SELL PRICE ($) | ESTIMATED GROSS PROCEEDS ($) |
|---|---|---|---|---|---|---|---|---|---|
| GO-64 | 15-MAY-2006 15:27 EDT | MARKET | 140.00 | 100 | 0.00 | FILLED | 15-MAY-2006 15:32 EDT | 273.10 | 27,310.00 |
| GO-25 | 15-MAY-2006 15:24 EDT | LIMIT | 125.00 | 50 | 350.00 | CANCELLED | 15-MAY-2006 15:34 EDT | 0.00 | 0.00 |
| SB-2 | 09-MAY-2006 10:55 EDT | MARKET | 115.00 | 120 | 0.00 | FILLED | 09-MAY-2006 11:00 EDT | 210.00 | 25,200.00 |
| SB-1 | 07-MAY-2006 10:55 EDT | MARKET | 125.00 | 100 | 0.00 | FILLED | 07-MAY-2006 11:00 EDT | 200.00 | 20,000.00 |

EXPORT OPTIONS: EXCEL | PDF

FIG. 9

HOME | MY ACCOUNT | ANALYTICS | CORPORATE ANALYTICS | HELP

EXECUTIVE OVERVIEW | OPTION VALUE | EMPLOYEE METRICS | AUCTION METRICS | EXTERNAL METRICS | BIDDER ANALYTICS | BIG BOARD | SITE USAGE

CORPORATE ANALYTICS :: BIDDER ANALYTICS

DAILY | WEEKLY | MONTHLY | YTD | YEAR

STRIKE PRICE - FROM: $ [ ]
TO: $ [ ]

| | 12 - DEC | | | 11 - DEC | | | 10 - DEC | | | 9 - DEC | | |
|---|---|---|---|---|---|---|---|---|---|---|---|---|
| | BIDDER 1 | BIDDER 2 | BIDDER 3 | BIDDER 1 | BIDDER 2 | BIDDER 3 | BIDDER 1 | BIDDER 2 | BIDDER 3 | BIDDER 1 | BIDDER 2 | |
| NUMBER WINNING BIDS | 0 | 0 | 0 | 0 | 0 | 0 | 0 | 0 | 0 | 0 | 0 | |
| NUMBER TIED WINNING BIDS | 0 | 0 | 0 | 0 | 0 | 0 | 0 | 0 | 0 | 0 | 0 | |
| WON BY | | | | | | | | | | | | |
| $0.05 - 0.10 | 0 | 0 | 0 | 0 | 0 | 0 | 0 | 0 | 0 | 0 | 0 | |
| $0.15 - 0.50 | 0 | 0 | 0 | 0 | 0 | 0 | 0 | 0 | 0 | 0 | 0 | |
| $0.55 - $1 | 0 | 0 | 0 | 0 | 0 | 0 | 0 | 0 | 0 | 0 | 0 | |
| >$1 | 0 | 0 | 0 | 0 | 0 | 0 | 0 | 0 | 0 | 0 | 0 | |
| LOST BY: | | | | | | | | | | | | |
| $0.05 - 0.10 | 0 | 0 | 0 | 0 | 0 | 0 | 0 | 0 | 0 | 0 | 0 | |
| $0.15 - 0.50 | 0 | 0 | 0 | 0 | 0 | 0 | 0 | 0 | 0 | 0 | 0 | |
| $0.55 - $1 | 0 | 0 | 0 | 0 | 0 | 0 | 0 | 0 | 0 | 0 | 0 | |
| >$1 | 0 | 0 | 0 | 0 | 0 | 0 | 0 | 0 | 0 | 0 | 0 | |
| WHEN LOSING: AVERAGE % OFF FROM WINNER | 0% | 0% | 0% | 0% | 0% | 0% | 0% | 0% | 0% | 0% | 0% | |
| CUMULATIVE POSITION OF EACH BIDDER ($) | $0 | $0 | $0 | $0 | $0 | $0 | $0 | $0 | $0 | $0 | $0 | |
| LOWEST DAILY QUOTED PRICE OVER INTRINSIC | $0 | $0 | $0 | $0 | $0 | $0 | $0 | $0 | $0 | $0 | $0 | |
| HIGHEST DAILY QUOTED PRICE OVER INTRINSIC | $0 | $0 | $0 | $0 | $0 | $0 | $0 | $0 | $0 | $0 | $0 | |
| END OF DAY DAILY QUOTED PRICE | $0 | $0 | $0 | $0 | $0 | $0 | $0 | $0 | $0 | $0 | $0 | |

FIG. 19

| HOME | MY ACCOUNT | ANALYTICS | CORPORATE ANALYTICS | HELP |

SYSTEM VALUE | EMPLOYEE METRICS | AUCTION METRICS | EXTERNAL METRICS | BIDDER ANALYTICS | OPTIONS BIG BOARD | SITE USAGE

CORPORATE ANALYTICS :: OPTIONS BIG BOARD     ABC STOCK PRICE $412 ▲ + $2.53  12-DEC-2005  4:00P.M. EST

OPTIONS QUOTES

| STRIKE PRICE | OPTION EXPIRATION | INDICATIVE PRICE | CHANGE | | HIGH BIDDER | TODAY | | | WINDOW PERIOD | | |
|---|---|---|---|---|---|---|---|---|---|---|---|
| | | | | | | HIGH | LOW | VOLUME | HIGH | LOW | VOLUME |
| $80.00 | 10-AUG-2014 | $345.25 | ▲ | $3.02 | Bidder 1 | $348.90 | $340.90 | 0 | $350.90 | $330.90 | 0 |
| $85.00 | 17-AUG-2014 | $341.16 | ▲ | $4.10 | Bidder 3 | $342.70 | $334.70 | 0 | $344.70 | $324.70 | 0 |
| $90.00 | 23-AUG-2014 | $335.04 | ▲ | $3.16 | Bidder 1 | $337.70 | $329.70 | 0 | $339.70 | $319.70 | 0 |
| $95.00 | 30-AUG-2014 | $326.67 | ▼ | $2.20 | Bidder 2 | $332.70 | $324.70 | 0 | $334.70 | $314.70 | 0 |
| $100.00 | 7-SEPT-2014 | $320.02 | ▼ | $5.01 | Bidder 3 | $319.70 | $327.70 | 0 | $329.70 | $309.70 | 0 |
| $105.00 | 14-SEPT-2014 | $324.22 | ▲ | $6.26 | Bidder 2 | $325.70 | $322.70 | 0 | $314.70 | $304.70 | 0 |
| $110.00 | 21-SEPT-2014 | $316.00 | ▲ | $3.07 | Bidder 1 | $317.70 | $309.70 | 0 | $319.70 | $299.70 | 0 |
| $115.00 | 28-SEPT-2014 | $295.78 | ▼ | $3.22 | Bidder 3 | $300.80 | $292.80 | 0 | $307.80 | $282.80 | 0 |
| $120.00 | 4-OCT-2014 | $298.09 | ▼ | $3.05 | Bidder 1 | $300.00 | $292.30 | 0 | $305.30 | $282.30 | 0 |
| $125.00 | 18-OCT-2014 | $280.02 | ▲ | $3.34 | Bidder 3 | $282.50 | $274.90 | 0 | $305.90 | $284.90 | 0 |
| $130.00 | 25-OCT-2014 | $287.59 | ▲ | $4.66 | Bidder 1 | $288.80 | $280.80 | 0 | $280.80 | $270.80 | 0 |
| $135.00 | 1-NOV-2014 | $284.43 | ▼ | $3.76 | Bidder 1 | $284.60 | $276.80 | 0 | $286.80 | $268.80 | 0 |
| $140.00 | 8-NOV-2014 | $278.31 | ▲ | $3.01 | Bidder 3 | $279.60 | $271.80 | 0 | $281.80 | $281.80 | 0 |
| $145.00 | 15-NOV-2014 | $274.23 | ▲ | $3.91 | Bidder 1 | $274.30 | $266.30 | 0 | $276.30 | $256.30 | 0 |
| $150.00 | 22-NOV-2014 | $262.14 | ▼ | $4.45 | Bidder 2 | $268.60 | $261.60 | 0 | $274.60 | $251.60 | 0 |

FIG. 20

TRANSACTION SYSTEM FOR EMPLOYEE STOCK OPTIONS AND OTHER COMPENSATION PROGRAMS

CROSS-REFERENCE TO RELATED APPLICATIONS

The present application is a continuation of U.S. patent application Ser. No. 11/607,552, filed Dec. 1, 2006 now abandoned.

BACKGROUND

The present invention is related generally to systems and methods for selling employee stock options or other instruments provided as part of a compensation program.

Many corporations issue stock options to some of their employees as part of their compensation plans. Employee stock options ("ESOs") are option contracts that give the employee the right, but not the obligation, to buy a certain amount of shares in their employer (the stock issuer) at a predetermined price ("the strike price"). In most circumstances, an employee must wait a specified period (the "vesting period") before being allowed to exercise the options. Also, ESOs are generally not transferable.

An ESO is considered to be "underwater" or "out-of-the-money" when the strike price is greater than the price at which the stock is trading. When an ESO is underwater, it typically has little or no value to the employee, although it may have a higher theoretical option value.

Published U.S. patent application Pub. No. 2005/0114242 discloses a system and method for the transfer of ESOs. In the process described in this published patent application, the issuer (e.g., the employer) issues a transferable ESO to an employee. A holding entity, through its broker-dealer, creates a bid for the ESO, which is submitted to the employee, who can decide whether or not to sell the ESO at the bid price. If the employee decides to sell the ESO, the broker-dealer buys the ESO from the employee for the bid amount with either cash or stock.

In another embodiment disclosed in the above-mentioned published patent application, the issuer issues ESOs to an employee having the conventional restrictions on transferability. At some point in time, the issuer determines that some of the employee's ESO should be transferable. The issuer, working with the broker-dealer, determines which of the employee's ESOs should be transferable. The broker-dealer then develops an option-price grid for those ESOs. The option-price grid is a grid that indicates the price for the ESOs based on the strike price for the ESOs and the trading price of the issuer's stock. After receiving the option-price grid, the employee has a period of time to decide whether to sell the ESOs at the price indicated by the option-price grid. If the employee decides to transfer the ESOs, the employee transfers the ESOs to the issuer. The issuer receives the payment for the ESOs from the broker-dealer and, in exchange, the issuer transfers amended ESOs to the broker-dealer. The employee also receives the payment for the options transferred to the issuer.

SUMMARY

In one general aspect, the present invention is directed to systems and methods for selling employee stock options (ESOs) or other instruments provided as part of a compensation program. According to various embodiments, the method may comprise the step of receiving bids from at least two bidders. The bids may each indicate a quantity of the ESOs to be bought at an offer price. The method may also comprise the step of receiving a sell order from a seller (e.g., an employee having ESOs) where the sell order indicates the number of ESOs to be sold. The sell order may also indicate the price and/or the strike date for the ESOs. A winning bid may be selected in an auction-type format, where the winning bid has the highest offer price and a bid size quantity that is at least the number of ESOs to be sold.

After a winning bid is selected, the issuer of the stock underlying the ESOs may then issue a derivative (e.g., a warrant, an over-the-counter (OTC) option, etc.) to replace the ESOs, which derivative is eventually transferred to the winning bidder. There may be more than one winning bidder if more than one winning bidder submits the highest offer price. In such circumstances, the ESOs may be awarded pro rata to the winning bidders. Also, the net proceeds from the sale of the employee stock options are transferred to an account of the seller. The derivative issued to replace the ESOs may entitle the holder thereof (e.g., the winning bidder unless subsequently transferred) to purchase a specified quantity of shares of stock (or other securities as the case may be) issued by the issuer, the quantity corresponding to the quantity of options (or other instruments as the case may be) sold pursuant to the sale order.

Further, the auction may be suspended until such time as there are at least two bidders with qualifying bids, e.g., non-zero price bids with quantities equal to or greater than the quantity to be sold in the auction. Also, various bidder protection and bidder anonymity safeguards may be used. The anonymity safeguards may include that the identity of the winning bidder and/or the winning offer price is not revealed to the nonwinning bidders. Also, the sale orders and the bids of other bidders may not be revealed to the other bidders.

In another general aspect, the present invention is directed to an ESO transaction system. According to various embodiments, the system may comprise at least one transaction engine for executing ESO transactions. In various implementations, the transaction engine may be programmed to suspend execution of a transaction (e.g., an auction) when there is less than two bidders with qualifying bids.

In various embodiments, the system may also comprise an analytics engine in communication with the transaction engine. The analytics engine may be configured to compute statistics associated with transactions performed through the ESO transaction system. For example, the analytics engine may be configured to provide the seller with various data, including an ESO price from the highest pending bid, an estimated fair price of the ESOs, a premium value over the intrinsic value of the ESOs, etc. The analytics engine may also be configured to provide the various bidders with their success rate in transactions handled by the system over a given amount of time. Various other analytics regarding transactions performed by the system may be provided to the issuer of the ESOs.

These and other features of the present invention will be apparent from the description below.

FIGURES

Various embodiments of the present invention are described herein by way of example in conjunction with the following figures, wherein:

FIGS. 6-10 and 12 are screen shots of user interfaces that an employee may access according to various embodiments of the present invention;

FIGS. 12-21 are screen shots of user interfaces the issuer (or somebody acting on behalf of the issuer) may access according to various embodiments of the present invention.

DETAILED DESCRIPTION

The present invention is directed generally to systems and methods for transacting sales of employee stock options (ESOs) or other instruments provided as part of a compensation program (such as restricted stock). Various embodiments of the present invention will be described below in connection with ESOs, but it should be recognized that the embodiments are generally applicable to these other instruments as well. The term "compensation instruments" is used herein to refer to both ESOs and such other instruments provided as part of compensation program (including restricted stock or other types of equity or debt securities or derivatives) unless otherwise noted.

Figure 1:
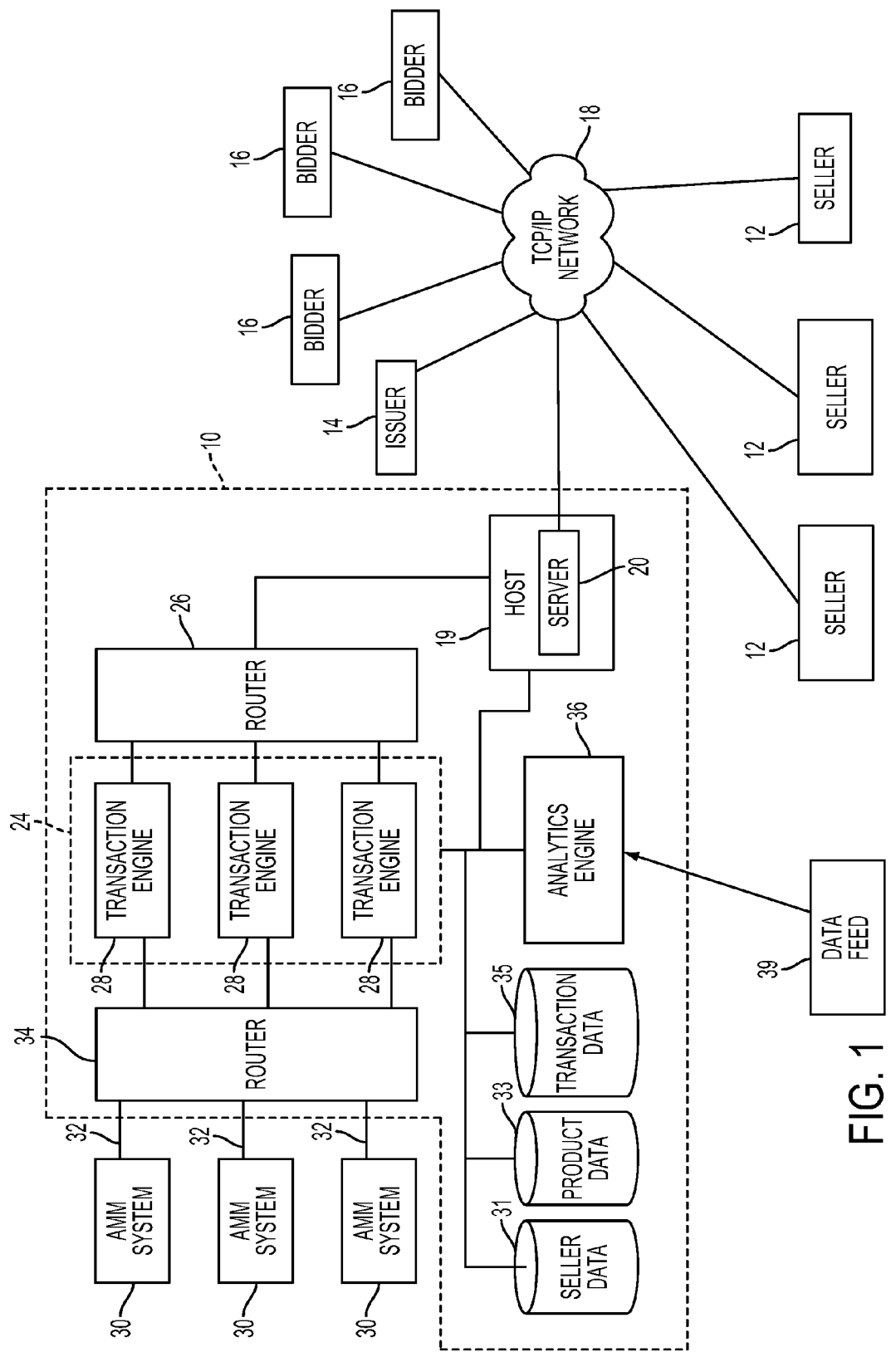
FIG. 1 is a diagram of an employee stock option transaction system according to various embodiments of the present invention.

FIG. 1 is a diagram of an ESO transaction system 10 according to various embodiments of the present invention. An ESO typically specifies an exercise (or strike) price and an exercise (or strike) date. The ESO entitles the employee (assuming the ESOs have vested) to purchase stock of the issuer (e.g., the employee's employer) at the strike price on or before the strike date. The transaction system 10 may permit one or more sellers 12 holding ESOs issued by an issuer 14 to sell their ESOs to one or more bidders 16. In various embodiments, the bidders 16 may be chosen by invitation. For example, the bidders 16 may be invited to participate by an administrator of the transaction system 10, by the issuer 14 of the ESOs, etc. In FIG. 1, only three sellers 12 and three bidders 16 are shown for the sake of simplicity. There may, of course, be more or fewer sellers and bidders.

The sellers 12 (e.g., employees of the issuer 14 having ESOs) may submit sell orders for some or all of their ESOs to the transaction system 10 via a communications network, such as a secure TCP/IP network 18. Because corporate employers typically issue numerous ESOs to their employees having different strike prices and/or different strike dates, the sellers 12 may specify the option grant from which the seller 12 wishes to sell ESOs as well as the number of options they wish to sell in their sell order using a web-based interface, as described in more detail below. By specifying the option grant, the strike date and strike will be known. Typically, all ESOs in an option grant awarded to an employee will have the same strike price, although an employee may be awarded numerous option grants, some or all having different strike prices. The sell order may be received by one or more host computer systems (referred to hereinafter as "host") 19 associated with the transaction system 10 and routed to a transaction engine system 24 by a router 26.

A product may be considered an ESO having a certain strike price and/or strike date. For ESOs having a strike date more than two years away, the strike date may be truncated to two years for ESOs sold through the transaction system 10. Because companies typically award option grants to different employees and at different times, there may be numerous options with different strike prices (e.g., different products issued by the issuer 14 over time). To efficiently handle the numerous possible products, the transaction engine system 24 may include a number of parallelized transaction engines 28. Each transaction engine 28 may be provisioned to handle the transactions for different groupings of products. That is, for example, a first transaction engine may be provisioned to execute the transactions for products having a strike price between $0 and $150, a second transaction engine may be provisioned to execute the transactions for products having a strike price between $150 and $300, a third transaction engine may be provisioned to execute the transactions for products having a strike price greater than $300, and so on. In various embodiments, the different transaction engines 28 may conduct transactions for different products (e.g., different strike prices) in parallel. Data regarding the products may be stored in a products database 33. The router 26 may route messages pertaining to a seller's sell order to the appropriate transaction engine 28 based on the product specified in the seller's sell order. Three transaction engines 28 are shown in the example of FIG. 1, although it should be recognized that the number of transaction engines 28 may be scaled accordingly, based on the number of products, for example.

As shown in FIG. 1, the transaction system 10 may also include an analytics engine 36. The analytics engine 36 may analyze the transactions executed by the transaction system 10, and various outputs of the analysis, in the form of charts and tables, for example, may be served to the sellers 12, the issuer 14, and the bidders 16 via the TCP/IP network 18, as described in more detail below. The charts and tables may be contained in web pages that are served to the sellers 12, the issuer 14, and the bidders 16 by a server 20 of the host 19.

Figure 2:
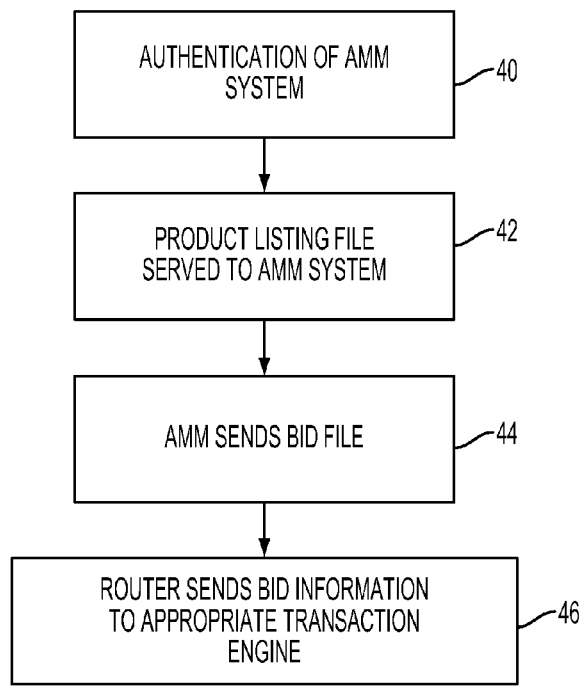
FIG. 2 is a flow chart of a process by which an AMM system may communicate bids to the transaction system according to various embodiments of the present invention.

The bidders 16 may place bids using automated market-maker (AMM) systems 30. The bidder AMM systems 30 may communicate with the transaction system 10 via a two-way communication link 32, such as a leased communication link. FIG. 2 is a simplified diagram of the process flow by which one of the AMM systems 30 may communicate bids to the transaction system 10 according to various embodiments of the present invention. At block 40, the transaction system 10 may authenticate the AMM system 30. This may be done by a bidder authentication server (not shown) associated with the transaction system 10. Once the AMM system 30 is authenticated, at block 42, the transaction system 10 may serve a file to the AMM system 30 containing a listing of the products. The product listing may correspond to the options granted by the issuer 14 and may specify, for example, the strike price and/or strike date for each ESO. For ESOs where the strike date is more than two years away, the strike date may be truncated to two years. At block 44, the AMM system 30 may transmit a file to the transaction system 10 containing its bids for the various products. The bids may specify a price and quantity for each product. At step 46, a router 34 (see FIG. 1) may route messages to the appropriate transaction engines 28 based on the bids from the AMM system 30. That is, the router 34 may route bid information for certain products to the transaction engine 28 that is handling the transactions for that product. The transaction engines 28 may add the bid information to their book in order to execute the transactions, as described in more detail below.

During the time the system 10 is active (e.g., market hours), each bidder may be required to continuously maintain a qualifying bid for each product handled by the transaction system 10, unless the bidder 15 or its corresponding AMM 30 is disabled by technical difficulties. The qualifying bids for each product may also have a required minimum number of options (e.g., 1,000 options). For example, each bidder may be required to maintain a bid on 1,000 options of each product handled by the transaction system 10. In various embodiments, a zero dollar bid, (e.g., a bid offering nothing for the minimum number of options) may be acceptable. That is a zero dollar bid may be considered to be a qualifying bid. A bidder may be motivated to submit a zero dollar bid, for example, for a product that is far "out of the money."

According to various embodiments, the transaction system 10 may require that the price bids from the bidder 16 be in certain size increments, such as five-cent increments, for example. In such embodiments, to accommodate various AMM systems 30, the transaction system 10 may also interpret certain bids, such as one cent bids, as qualifying zero dollar bids. Zero dollar bids and bids treated as zero dollar bids may be qualifying bids as far as the above-described requirement that all invited must continuously maintain qualifying bids, but such bids may be treated as being incapable of winning the auction by the transaction system 10. If all of the bidders make zero dollar bids, the auction may be suspended until such time as there is at least one valid non-zero dollar bid.

Preferably, as described further below, the various bidders 16 are not aware of any other bidder's bids. In various embodiments, the bidders 16 also may not be aware of how many other bidders, if any, are active, or even if any sell orders are pending.

In various embodiments, sellers may be permitted to submit a sell order at any time. During market hours, the sellers may be provided with an indication of the highest pending bid for a given product before making a sell order for that product. Orders submitted aftermarket hours may be queued for execution during market hours on the next trading day. In order to promote fairness, there may be a limit on the number of options a seller may sell in one transaction. That limit may match the minimum bid number and may be 1,000 options, for example. That is, in any one transaction, a seller may be prohibited from offering more than 1,000 options at a particular strike price/strike date. A seller may be permitted, however, to place several orders to sell options having the same strike price and/or strike date such that, in the aggregate, more than 1,000 options are offered.

According to various embodiments, sellers may be permitted to place market orders, limit orders, or both. A market order is an order to sell the ESOs at the highest bid price available when the order is considered. A limit order is an order in which the seller specifies the price (e.g., a "limit" or "reserve" price) for the ESOs. When the specified price is reached or exceeded, the options are sold at the bid price. In various embodiments, the limit order may also set forth a time period. If the specified price is not reached within the time period, then the order may be cancelled. Also, in some embodiments, a seller may be prohibited from placing sell orders (either limit or market orders) for ESOs that are close to expiration, such as within six months of expiration.

Sell orders may be processed by the transaction system 10 on a first-in, first-out basis (or queue). Such a first-in, first-out time order may also apply in embodiments where sellers are allowed to submit both market and limit orders. According to various embodiments, there must be a required minimum number of active bidders (e.g., two bidders who have made the required minimum bid) for a transaction to occur; otherwise, the transaction is suspended. That is, for example, the transaction engines 28 may be programmed to handle a queued order only if there are at least two bidders whose bid size is greater than the number of options in the queued order. As described in more detail below, the transactions may be suspended until such time that one or more of the AMM systems 30 can refresh their bids so that there are at least two participating bidders. It will also be appreciated that the minimum number of bidders may be greater than two as well.

According to various embodiments, the sale of the ESOs may be conducted according to an auction. For example, the highest bid pending when a sell order is considered wins the auction. If a tie occurs, the order may be split pro rata among the winning bidders. Any remaining odd share may be awarded randomly to one of the winners.

Preferably, the auctions follow certain bidder anonymity safeguards. For example, only the winning bidder may be notified that it has won the order. The other bidders may not be notified that they lost the order and, in various embodiments, the nonwinning bidders may not even be aware that an order has been considered. That is, in various embodiments, the bidders are not made aware of the sale orders in the execution queue (whether market or limit orders), and the nonwinning bidder may not even know that an auction has occurred. The winning bidder(s), of course, receive notification of their winning bids. Also, the bidders preferably are not made aware of the bids by the other bidders. Further, the identity of the winning bidder(s) is preferably not revealed to the nonwinning bidders. In various embodiments, however, each of the bidders may be provided with a success rate, or "batting average," information regarding their bidding that discloses to each of the bidders individually and privately the percentage of sell orders won by the bidder in each product category, as described in more detail below. In such an embodiment, the transaction engines 28 may be programmed to: (i) not notify the bidders of bids from other bidders; (ii) not notify the bidders of the sale orders in the queue prior to the auction; (iii) not notify the nonwinning bidders that the at least one winning bidder has been determined for the auction; and/or (iv) not notify the nonwinning bidders of the identity of the at least one winning bidder.

Although most of the embodiments described herein require at least two bidders, in other embodiments of the present invention, there may be no requirement regarding the minimum number of bidders. For example, in such embodiments, only one bidder may participate. Some or all of the above-described anonymity safeguards may apply in such auctions.

According to various embodiments, after a bidder wins an order for a given product, the bidder's current size bid for the product may be decremented accordingly. If, as a result, the bidder's current bid for the product is for fewer shares than the next sell order for that product in the queue, the transactions may be suspended until the bidder (e.g., its associated AMM system 30) has refreshed its bid to the minimum amount (e.g., 1,000 shares). For systems supporting limit orders, the sale of limit orders may not be guaranteed if a limit price is reached and bids at the limit are exhausted before all limit orders at that price are filled.

Because ESOs are typically not transferable, upon the successful completion of transactions (preferably at the end of the day) the issuer 14 may be notified of the ESOs sold through the transaction system 10. The issuer 14 may then rescind the ESOs and in their stead issue replacement derivations (e.g., warrants, over-the-counter (OTC) options, etc.) to purchase stock of the issuer at the strike price. According to various embodiments, the derivations issued by the issuer 14 in place of the sold ESOs may have an expiry that is equal to the lesser of the current term on the sold ESOs or some predetermined time period, such as two years. The issued derivations may then be delivered to the winning bidder, and an account of the seller may be credited with the sale proceeds (less tax withholdings). In various embodiments, the issued derivations may be delivered to the winning bidder through an intermediary, for example, as described in more detail below.

Figure 3:
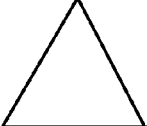
FIG. 3 is a chart illustrating the transaction process according to various embodiments of the present invention.

FIG. 3 is a chart showing an example of how a number of bids and sell orders for a particular product may be executed. In this example, the products are ESOs with a strike price of $350, and the minimum number of bidders is three. It will be appreciated that other various embodiments may have a minimum number of bidders higher or lower than three. The transaction for the first order in the queue may commence at 9:30 a.m. EST. At this time, bids from three bidders are present:

| Bidder | Quantity | Price |
|---|---|---|
| Bidder 1: | 1,000 Options | $100 |
| Bidder 2: | 1,000 Options | $90 |
| Bidder 3: | 1,000 Options | $99 |

The first sell order, considered at 9:30:01 am EST is for 800 options. Based on the pending bids, Bidder 1 wins, and 800 options (i.e., the winning allotment) are decremented from Bidder 1's bid size quota offer. Accordingly, Bidder 1's pending bid is now for 200 options. At 9:30:02, Bidder 3 updates his bid to $102, and the system 10 attempts to consider a second sell order for 500 options. It can be seen, however, that the pending bid of Bidder 1 is still less than the minimum requirement and also less than the amount of the second sell order. Accordingly, there are only two bidders with qualifying bids. Because the minimum number of bidders in this example embodiment is three, consideration of the second sell order may be suspended until the AMM system for Bidder 1 can refresh its bid.

Bidder 1 refreshes its bid to 1,000 options at $99 by time 9:30:06. Accordingly, all three bidders now have qualifying bids. Based on the pending bids, Bidder 3 wins the second sell order, and 500 options (the winning allotment for the second transaction) are decremented from Bidder 3's option bid size. By 9:30:08, Bidder 2 has refreshed its bid to $103, and a third sell order for 400 options is considered. Although Bidder 3's bid is now for 500 options at $102, it may still be a qualifying bid because it recites a number of options (e.g., 500) greater than the number recited by the third sell order (e.g., 400). Accordingly, because there are three qualifying bids pending, the third sell order is won by Bidder 2, and Bidder 2's pending bid is decremented accordingly.

Because there are no more sell orders in the queue, no transactions are executed at time 9:30:09. Bidder 2 and Bidder 3 are still in the process of refreshing their bids at this point, but because both Bidders 2 and 3 have a pending bid for at least 500 options, a sell order of 500 options or less (including either a limit or market order) could have executed at this time had it been in the queue. By time 9:30:10, the bids for both Bidder 2 and Bidder 3 have been refreshed, but there are still no sale orders in the queue, so the bidders will have to wait for the next transaction.

If a bidder does not refresh its bids within a certain time period (e.g., two minutes), the transaction system 10 may consider that bidder to be out of the auction. If the minimum number of required bidders is still satisfied without the lost bidder, the transactions may proceed without that bidder. However, if the minimum number of required bidders is not satisfied without the lost bidder, the ESO transactions may be suspended until such time as there is a sufficient number of bidders.

Limit orders may be executed in a time sequence, too. For example, if a limit order for a particular product is placed prior to a market order for the same product, if a bid meeting or exceeding the limit price specified in the limit order is received and that meets or exceeds the number of options being sold in the limit order, the limit order will be filled before the market order. In such a circumstance, the bid from the winning bidder may have to be refreshed before the next order in the queue is executed.

According to various embodiments, the transaction system 10 may also implement bidder protections. For example, the bidder protections may protect a bidder from winning too many transactions in a certain time period. For example, if a particular bidder wins bids for ESOs within a certain time frame (e.g., five seconds) or number of auctions that exceed a predetermined threshold quantity (e.g., ten thousand ESOs across all products), the transaction system 10 may suspend auctions involving that bidder and send a communication to the bidder (e.g., an email) querying whether it intended to win all of those auctions. Such a bidder may be suspended from all auctions until it confirms that it intended to win the auctions. Such bidder protection mechanisms may be provided by a bidder protection engine (not shown) of the transaction system 10. The bidder protection engine may aggregate and analyze the auction data from across all of the transaction engines 28 to implement such bidder protections. The bidder protection engine may also initiate the communication to a bidder who wins too many auctions in the defined time period.

According to various embodiments of the present invention, employees with ESOs may sign or otherwise assent agreement to a new covenant that makes the ESOs transferable to a particular party, such as the entity operating the transaction system 10 (e.g., an "auction agent"), if sold through the program associated with the transaction system 10. For ESOs that are sold through the program, the sellers 12 may sell their ESO to the auction agent. The issuer 14 may then rescind the ESOs and, as described further below, issue in their stead the replacement derivatives (e.g., warrants, options (e.g., OTC options, etc.) that the auction agent may sell to the winning bidder. The proceeds from the sale may then be transferred to the seller 12 (less tax withholdings, etc.). The replacement derivatives sold to the winning bidder may or may not have restrictions on transferability. If they do not have such restrictions, the replacement derivatives may be sold/bought in an aftermarket.

Figure 4:
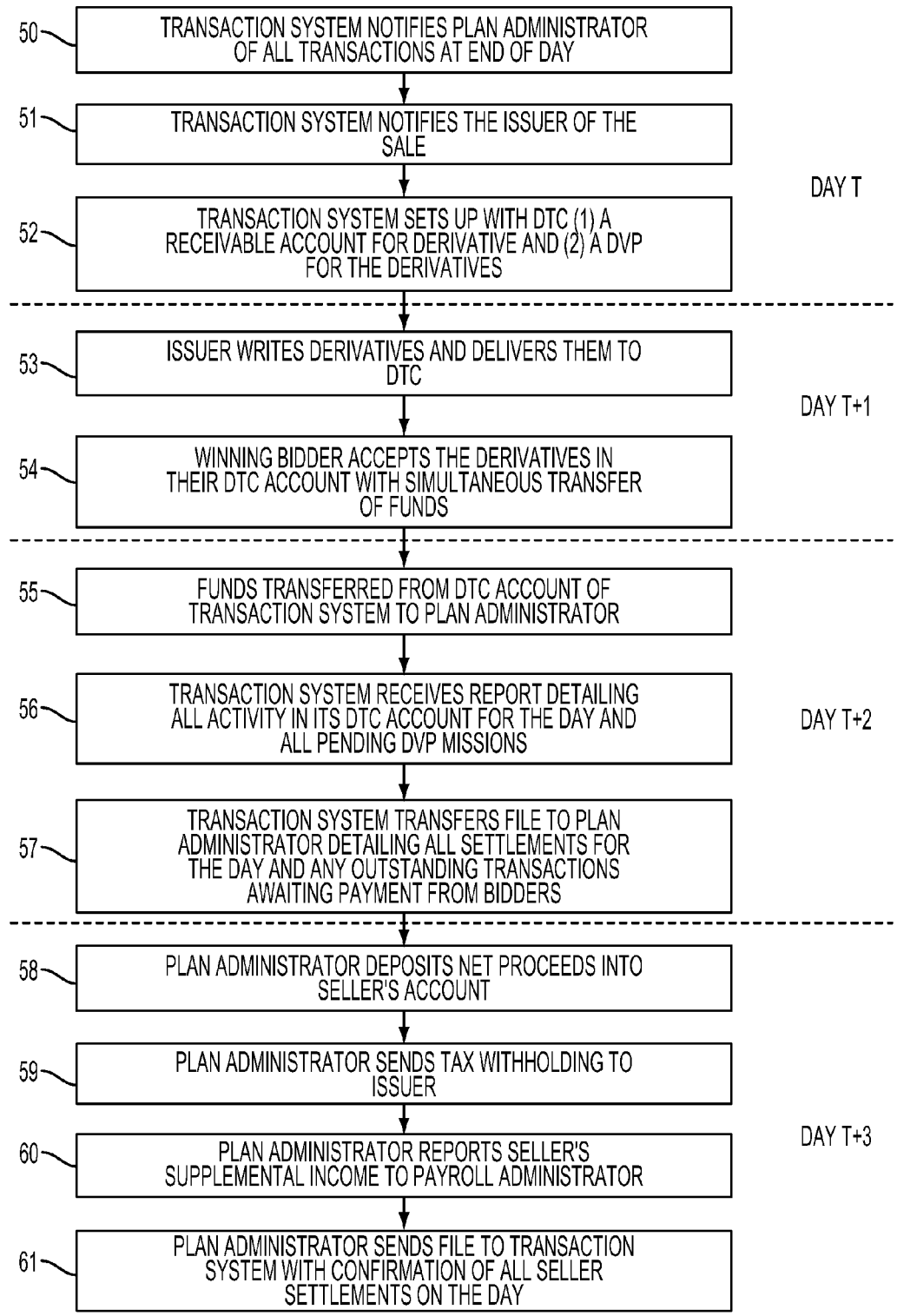
FIGS. 4 and 5 are diagrams illustrating a settlement process for the sale of employee stock options according to various embodiments of the present invention.
Figure 5:
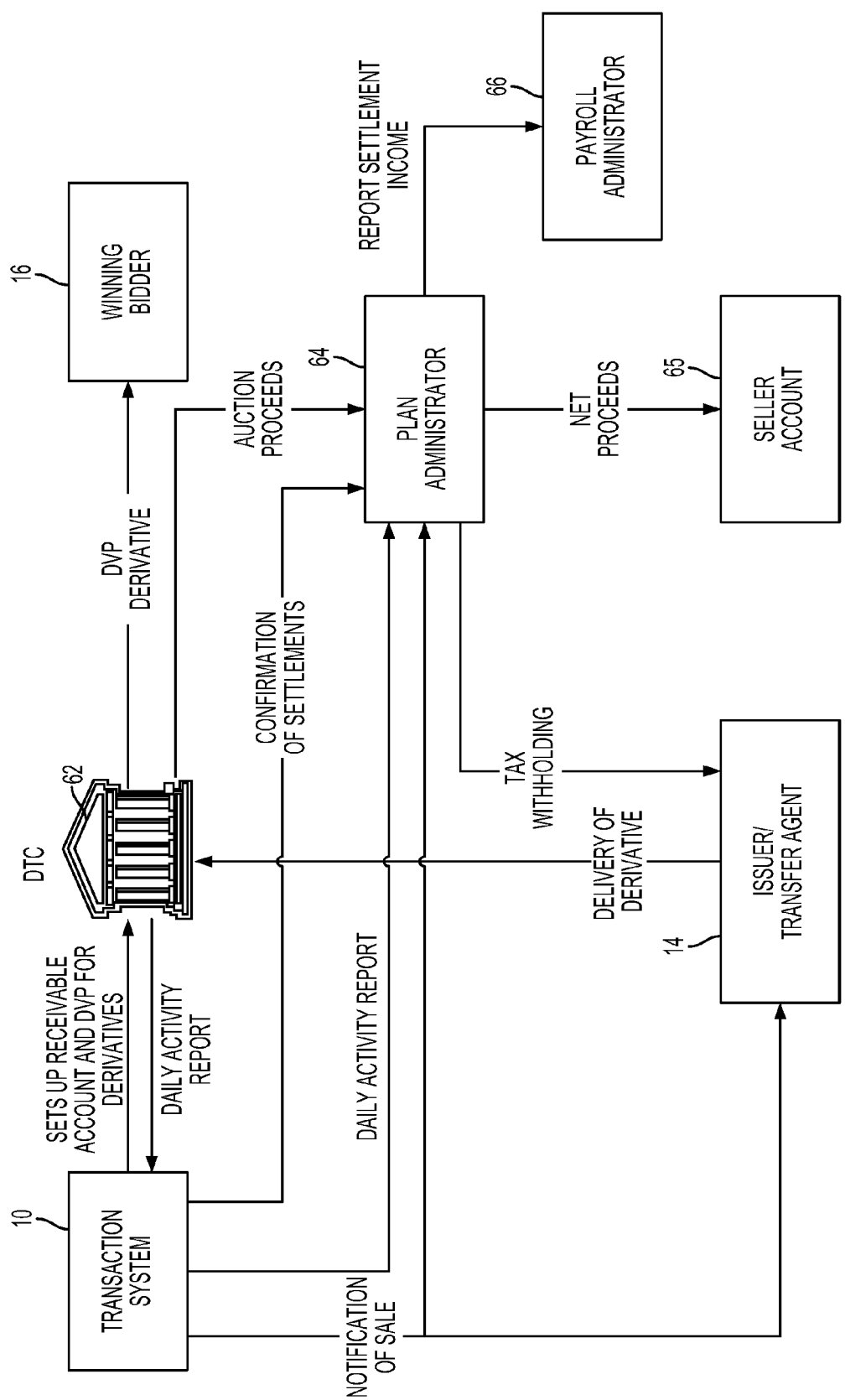

FIGS. 4 and 5 illustrate a process by which the sale of the ESOs may be settled. For purposes of the illustrated embodiment, settlement may occur through the Depository Trust Company ("DTC") 62. The DTC is a central securities certificate depository owned by brokerage houses through which members effect security deliveries between each other via computerized bookkeeping entries, although it should be recognized that in other embodiments a different repository may be used.

According to the illustrated embodiment, at the end of the day (e.g., after the time period for the transactions has ended), starting at step 50, the transaction system 10 may notify the plan administrator 64 of all the executed orders (e.g., market and limit orders) that occurred during the day. The plan administrator 64 may be the entity which administers the employee stock option plan of the issuer 14. As part of this step, the transaction system 10 may deliver a file to the plan administrator 62 that, for each transaction executed during the day, identifies: the seller ID, the grant ID, the trade ID, the grant price, the quantity, the trade price, etc. Similarly, at step 51, the transaction system 10 may notify the issuer 14 (and/or its transfer agent (not shown)) of the transactions executed during the day. The data delivered to the issuer 14 (and/or its transfer agent) may be similar to the data delivered to the plan administrator 64.

According to various embodiments, step 51 may be performed before step 50, or the steps could be performed simultaneously. Also, either or both of the notifications of steps 50 and 51 may occur in real time or near real time. That is, for example, according to various embodiments, the issuer 14 (and/or its transfer agent) may be notified of each executed transaction shortly after the transactions are completed throughout the day, whereas the plan administrator 64 may be notified at the end of the day of all transactions that occurred during the day.

At step 52, the transaction system 10 may establish two missions with the DTC 62. One mission may be the establishment of a receivable to accept the derivatives issued by the issuer 14 to replace the sold ESO. This receivable account may be associated with the system 10 and/or an administrator or provider of the system 10 (e.g., the plan administrator, a third-party financial institution, etc.). The second mission may be a DVP (delivery versus payment) order to deliver the derivatives (when received) to an account of the winning bidder 16 in exchange for payment of the sale proceeds from the winning bidder 16. As indicated in FIG. 4, steps 50-52 may occur the day (denoted as "Day T") of the executed transaction.

At step 53, the issuer 14 (and/or its transfer agent on behalf of the issuer 14) may rescind the seller's ESOs and, in their place, write the corresponding replacement derivatives, and deliver the derivatives to the DTC account associated with the transaction system 10 created in step 52.

Upon receipt of the replacement derivatives at the DTC account associated with the transaction system 10, the DVP order may be triggered. As such, at step 54, the winning bidder 16 may accept the issued derivatives into its DTC account from the DTC account associated with the system 10. A simultaneous transfer of funds covering the sale price may be made to the DTC account associated with the transaction system 10. Accordingly, in various embodiments, the replacement derivatives may be issued to the transaction system administrator, who in turn sells them to the winning bidder.

At step 55, the funds may be transferred from the DTC account associated with the transaction system 10 to the plan administrator 64 (e.g., minus any commission due to the system administrator 10). According to various embodiments, the transfer may use the Fedwire electronic transfer system. This transfer may also be a nightly feed for all proceeds for Day T. At step 56, the transaction system 10 may receive from the DTC 62 a report detailing all activity in its DTC account and all pending DVP missions. At step 57, the transaction system 10 may transfer to the plan administrator 64 a file detailing all settlements for the day as well as any outstanding transactions awaiting payment from bidders 16.

At step 58, the plan administrator 64 may deposit the net proceeds from the ESO transactions in the employees' accounts 65 (less tax withholding, for example). At step 59, the plan administrator 64 may deliver the tax withholding to the issuer 14 (and/or its transfer agent) via Fedwire, for example. At step 60, the plan administrator 64 may report the sellers' supplemental income from the sale of the ESOs to the payroll administrator 66 for the issuer 14. And at step 61, the plan administrator 64 may send a batch file to the transaction system 10 with confirmation of all settlements on day T.

According to various embodiments, as indicated in FIG. 4, steps 53-54 may occur the following business day after the sale of the ESOs (Day T+1), steps 55-57 may occur within two business days following the transaction (Day T+2), and steps 58-61 may occur within three business days following the transaction (Day T+3). That way, settlement may occur within three business days following the transaction. In other embodiments, settlement may occur in fewer or more than three business days. According to various embodiments, however, the entity associated with the transaction system 10 may be responsible for paying the seller on day T+3. That way, if for some reason the winning bidder fails to pay in time, the seller may still get paid on day T+3, and it is up to the entity associated with the transaction system 10 to recover the sale proceeds from the winning bidder.

Additionally, according to various embodiments, a single entity may play one or more of the roles illustrated in FIG. 5. For example, the entity employing the transaction system 10 may also be the plan administrator 64. That entity, for example, could also be a bidder 16 in the transactions.

As described above, the auctions may be executed using a first-in, first-out time order based on the received sale orders. In another embodiment, the sale orders may be aggregated. For example, the ESOs from a number of sale orders received in a defined time period may be aggregated and auctioned one or more lots (e.g., lots of 1000 options). The defined time period may be a number of minutes, a number of hours, or a trading day, for example. Thus, for example, all the sale orders received in a trading day for each product may be aggregated at the end of the day, with the options divided into lots and auctioned at the end of the day (or other defined time period).

According to various embodiments, if the transaction system 10 detects that a seller has placed a sell order for ESOs that it has also exercised, the transaction system 10 may cancel (or bust) the sale order. The transaction system 10 may perform this operation based on data received from the plan administrator 64 regarding ESOs exercised by employees.

Referring back to FIG. 1, a seller 12 may access the transaction system 10 via the network 18 to sell his/her ESOs. First, the seller 12 may go through a registration and authentication routine to verify the identity of the seller 12. Data regarding the sellers, including their option grants, may be stored in the seller database 31. Once access to the system is gained, the server 20 may serve an interactive web-based user interface to the seller 12 through which the seller 12 can view his/her options, submit orders to sell ESOs, and analyze the transactions in order to evaluate whether he/she should hold the ESOs or sell them. FIGS. 6-10 and 12 are examples of screen shots of the web-based user interface according to various embodiments of the present invention.

FIG. 6 is an example of a screen shot of a web page that displays an overview of the seller's ESOs. The overview display may be obtained by activating the "Overview" link in the menu field 98. As seen in the illustrated example, in the upper right portion, the screen shot may include a field 99 that lists the current trading price of the stock of the issuer 14, its change relative to the previous trading day, and the present date/time. The screen shot may also include a table 100 listing in tabular form the number of the option grants, the dates the option grants were awarded to the seller by the issuer, the dates the options expire, the dates the options become fully vested, and the strike price of the options. This data may be stored in the seller database 31 (see FIG. 1). Also as seen in FIG. 6, the table 100 may also include the number of available options for each grant. The number of available options may be broken down by the number that are vested, the number that are unvested, and the number that are held. The number of options that are held may be the sum of the vested and unvested options.

The table 100 may also include a column 102 listing the approximate intrinsic value of the vested options for each option grant based on the current trading price for the stock. The available vested intrinsic value may be determined based on the difference between the trading price for the stock underlying the ESOs (e.g., the stock issued) and the strike price for the ESOs. The available vested intrinsic value may be computed by the analytics engine 36 (see FIG. 1) based on, for example, one or more data feeds 39 from market exchanges regarding the current trading prices of options for stock issued by the issuer 14.

The table 100 may also include a portion 104 that lists the approximate proceeds the seller could realize by selling his/her ESOs using the transaction system 10. The analytics engine 36 may compute the estimated proceeds based on transaction data regarding similar ESOs. The transaction data may be stored in the database 35 (see FIG. 1). When the estimated proceeds are greater than the estimated intrinsic value (see column 102), there may be an incentive for the seller to sell his/her ESOs rather than to hold them.

Figure 7:
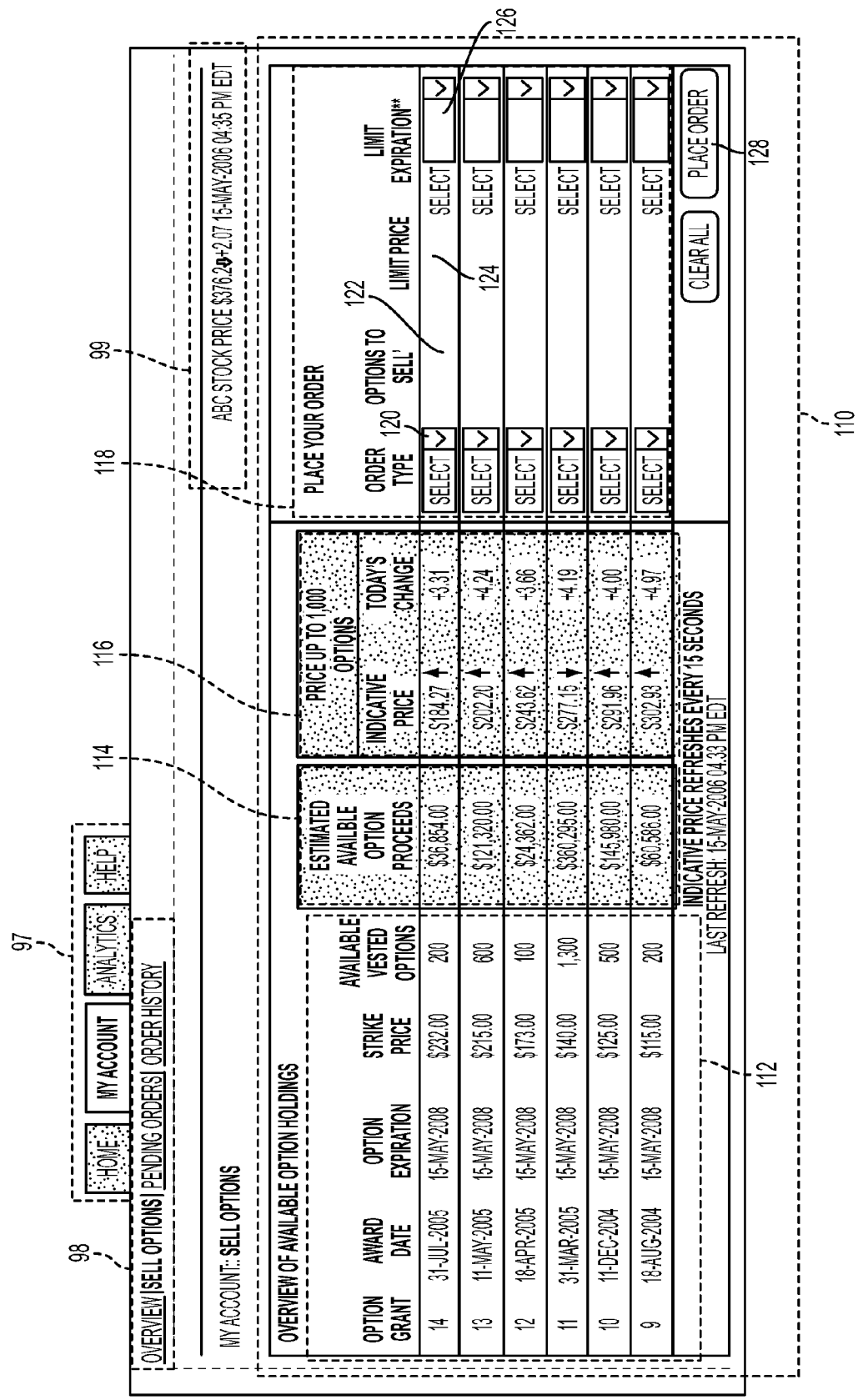

FIG. 7 is an example of a screen shot through which the seller 14 may place sell orders for his/her ESOs. This screen shot may be obtained by activating the "Sell Options" in the menu field 98. This screen shot may include a table 110 that provides an overview of the options the seller has available to sell. In such a transaction system, it may be preferable that the seller can only sell vested options. Thus, only the option grants where at least some of the options have vested may be shown in the table 110. As shown in the illustrated example, the table 110 may include a portion 112 that lists data regarding the numbers of the option grants granted to the seller, the award date of the option grants, the date the options will expire if sold through the transaction system 10, the strike price for the options, and the number of shares of each option grant that have vested. In the illustrated embodiment, the options issued by the issuer 14 expire on the earlier of the two years from the transaction date and the actual expiration date. Thus, in the illustrated embodiment, the option expiration is listed as 15 May 2008, which is two years from the current date (see field 99).

The table 110 may also include a column 114 that lists the estimated available proceeds from selling the vested ESOs through the transaction system 10. Again, the analytics engine 36 may compute this value based on past transaction data stored in the database 39.

As mentioned before, there may be a limit on the number of shares/options a seller can sell via the transaction system 10 in one transaction. In one embodiment, the limit may be one thousand shares/options. Accordingly, the table 110 may also include a field 116 that lists the current price for one thousand options at the specified strike price for each available option grant. The field 116 may also indicate whether that price is rising or falling, as well as the change in price over the previous trading day. The change may be displayed in absolute terms (as shown in FIG. 7), by percentages, or both.

In addition, the table 110 may include a field 118 where the seller may place the sell orders. Using a drop-down window 120, for example, the seller may specify a market or limit order type. In field 122, the seller may specify the number of options to be sold. Again, the ESO transaction rules may place a limit on the maximum number of options that can be sold in a transaction (e.g., 1,000 options). If the seller specifies a limit order, the seller can specify the limit price and the limit expiration in the fields 124 and 126, respectively. The seller can place the order by activating the "Place Order" icon 128. The orders may then be received by the transaction system 10 via the network 18, with the router 26 routing messages to the appropriate transaction engines 28 based on, for example, strike price. The transaction engines 28 may then add the order to their transaction queue, as described above.

Figure 8:
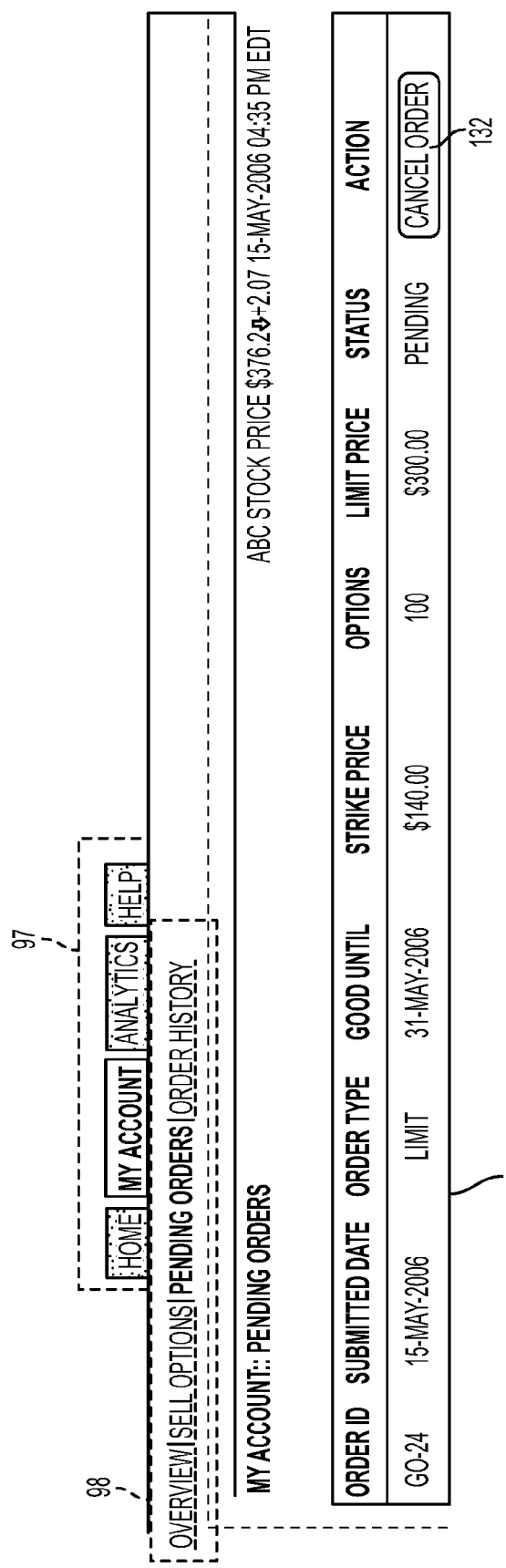

FIG. 8 is an example of a screen shot the seller may view to view his/her pending sale orders. The screen shot of FIG. 8 may be obtained by activating the "Pending Orders" link in the menu field 98. This screen shot may include a table 130 listing the pending sale orders of the seller. The table 130 may include, for example, an alphanumeric order ID assigned to each pending order, the date the order was submitted, the order type, the date the order is good until (for limit orders), the strike price, the number of options to be sold, the limit price (for limit orders), and the status of the sale. According to various embodiments, the table 130 may also include an icon 132, the activation of which may allow the seller to cancel the order. For example, some types of sell orders (e.g., various limit sell orders) may be cancelable by the seller 12.

FIG. 9 is an example of a screen shot the seller may view to view his/her order history. The screen shot of FIG. 9 may be obtained by activating the "Order History" link of the menu field 98. According to various embodiments, this screen shot may include a drop-down window 140 where the user may select the type of order status for the orders to be viewed. Using the drop-down window 140, the seller may select, for example, all orders (as shown in the example of FIG. 9), filled orders, cancelled orders, or pending orders.

The user interface of FIG. 9 may also include a table 142 that includes data regarding the order that satisfies the order status filter setting set in the drop-down window 140. For each order that satisfies the order status filter setting, the table 142 may list in tabular form the order ID, the date the order was submitted, the order type, the strike price, the number of options sold (or to be sold), the limit price (for limit orders), the status of the sale order (e.g., filled, cancelled, pending, etc.), the date/time the order was executed or cancelled, the sell price, and the estimated gross proceeds. The estimated gross proceeds may be computed by multiplying the sale price by the number of options sold.

As seen in the lower left portion of the screen shot of FIG. 9, the "Order History" user interface may also provide a command field 144 by which the seller can order a file (such as a PDF or Excel file) for exporting via the network 18 that contains the data of the table 142.

Figure 10:
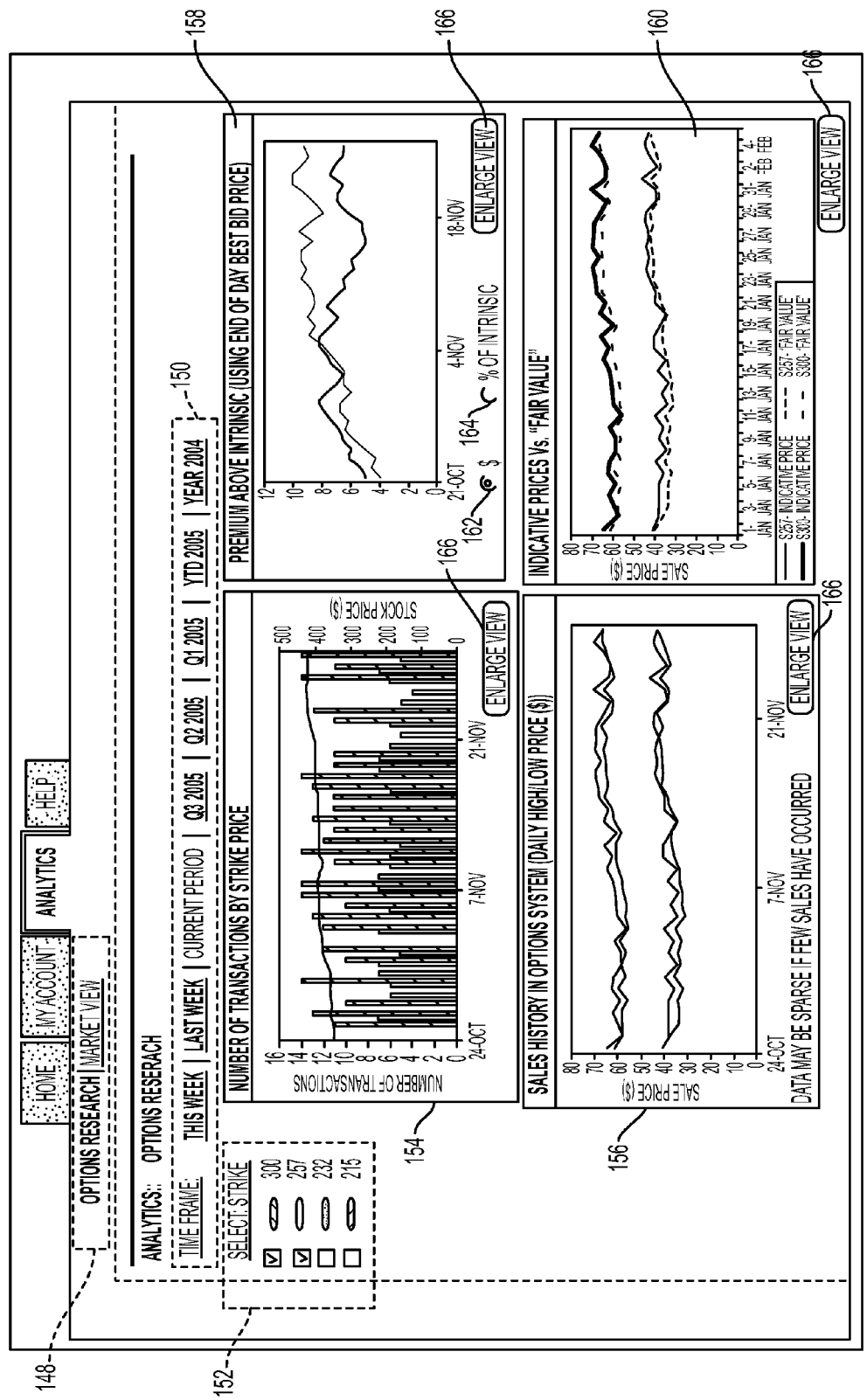

The seller may be able to view additional seller-oriented analytics regarding the transactions by clicking on the "Analytics" tab in the menu field 97. The analytics may be determined by the analytics engine 36 and served to the seller 12 via the host 19. FIG. 10 is a screen shot of an exemplary seller analytics user interface according to various embodiments of the present invention. According to the illustrated embodiment, the employee may select between analytics regarding the ESO by selecting the "Options Research" link in menu field 148 or analytics regarding the stock underlying the ESOs (e.g., the stock issued by the issuer) by selecting the "Market View" link in the menu field 148.

In the example of FIG. 10, the "Options Research" link is selected. As a result, the chart shown in the user interface of FIG. 10 conveys information about the selling of ESOs using the transaction system 10. As shown in the illustrated embodiment, the interface may include a time frame field 150 where the user may select the time frame over which the transaction data is to be analyzed. In this example, the possible time frame selections include the current week, the prior (or last)

week, the current period (e.g., the current yearly quarter), past yearly quarters, the year to date, or past years. In this example, the current period is selected.

The user interface may also include a strike price selection field 152. This field may be populated with the strike prices of the option grants issued to the employee. In this example, the employee has option grants with four different strike prices: $300, $257, $232, and $215. Each strike price may be associated with a unique identifier for the charts 154-160. The identifier may be a unique color or hatching symbol for each strike price. The employee may select which strike prices he/she wishes to analyze by selecting the corresponding check boxes in the field 152.

Based on the employee's time period selection in the field 150 and the strike price selections in the field 152, the analytics engine 36 may compute various metrics related to the ESOs, which may be displayed in the charts 154-160 in the user interface. The chart may include a first chart 154 which shows the number of transactions per day for the specified strike prices over the specified time period. A second chart 156 may depict the sales history for the specified strike prices over the specified time period. The sales history chart 156 may indicate the daily high and low sale price for the specified strike prices. In this example, it can be seen that the $300 ESOs sold for between about $60 and $70 over the specified time period, and that the $257 ESOs sold for between about $30 and $40.

A third chart 158 may show the premium over the intrinsic value of the ESOs that may be realized through selling the ESOs through the transaction system 10. The intrinsic value may be computed by the analytics engine 36, as described above, by subtracting the strike price of the ESOs from the trading price for the stock. The premium over the intrinsic value may be determined by the analytics engine 36, according to one embodiment, by subtracting the intrinsic value from the best price on the previous transaction day for options having the same (or a substantially similar) strike price. Using radio buttons 162, 164, the employee may select whether to have the chart 158 show the premium in terms of actual dollars or by a percentage of the intrinsic value.

A fourth chart 160 may depict the indicative sale price of the ESOs versus an estimated fair value price for the ESOs for the specified strike prices. The indicative price may be determined by the analytics engine 36 based on the transaction data for ESOs sold through the transaction system 10 with the same or similar strike prices. The estimated fair value price may be a price designed to indicate what the options would trade for in an over-the-counter options market.

Figure 11:
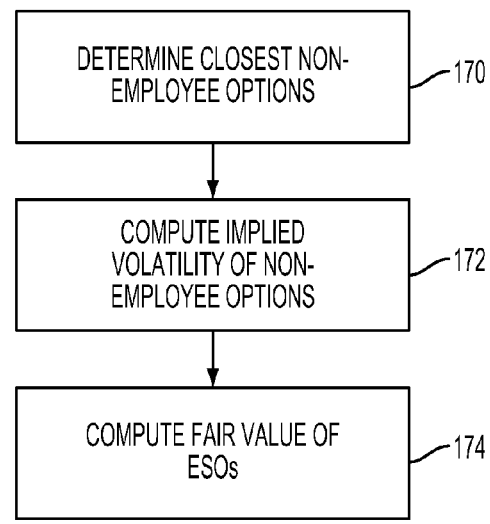
FIG. 11 is a diagram of a process flow of a method for determining a fair value of an employee stock option according to various embodiments of the present invention.

FIG. 11 is a flow chart of a process the analytics engine 36 may use to compute the estimated fair value price for the ESOs. Starting at step 170, the analytics engine 36 may determine the closest nonemployee options for the issuer's stock that are similar to the employee's ESO in terms of strike price and expiration date. According to various embodiments, the analytics engine 36 may employ a nearest-neighbor algorithm to determine the closest nonemployee options, preferably giving priority to expiration date over strike price. The data for the nonemployee options may be stored in a database or obtained from the data feed 39. At step 172, the analytics engine 36 may use a reverse Black-Scholes model to compute the implied volatility of the nonemployee options. Then, at step 174, the analytics engine 36 may use a forward Black-Scholes model to compute the fair value of the ESOs using the implied volatility determined at step 172.

According to various embodiments, the analytics engine 36 could also be customizable for different issuers. For example, the interpolation functions used in the Black-Scholes models may be how deep into the money or how out of the money the ESOs of the issuer are.

Referring back to FIG. 10, each of the charts 154-160 may include an "Enlarge View" button 166, which, when activated by the user, may bring up an enlarged view of the selected graph 154-160.

Figure 12:
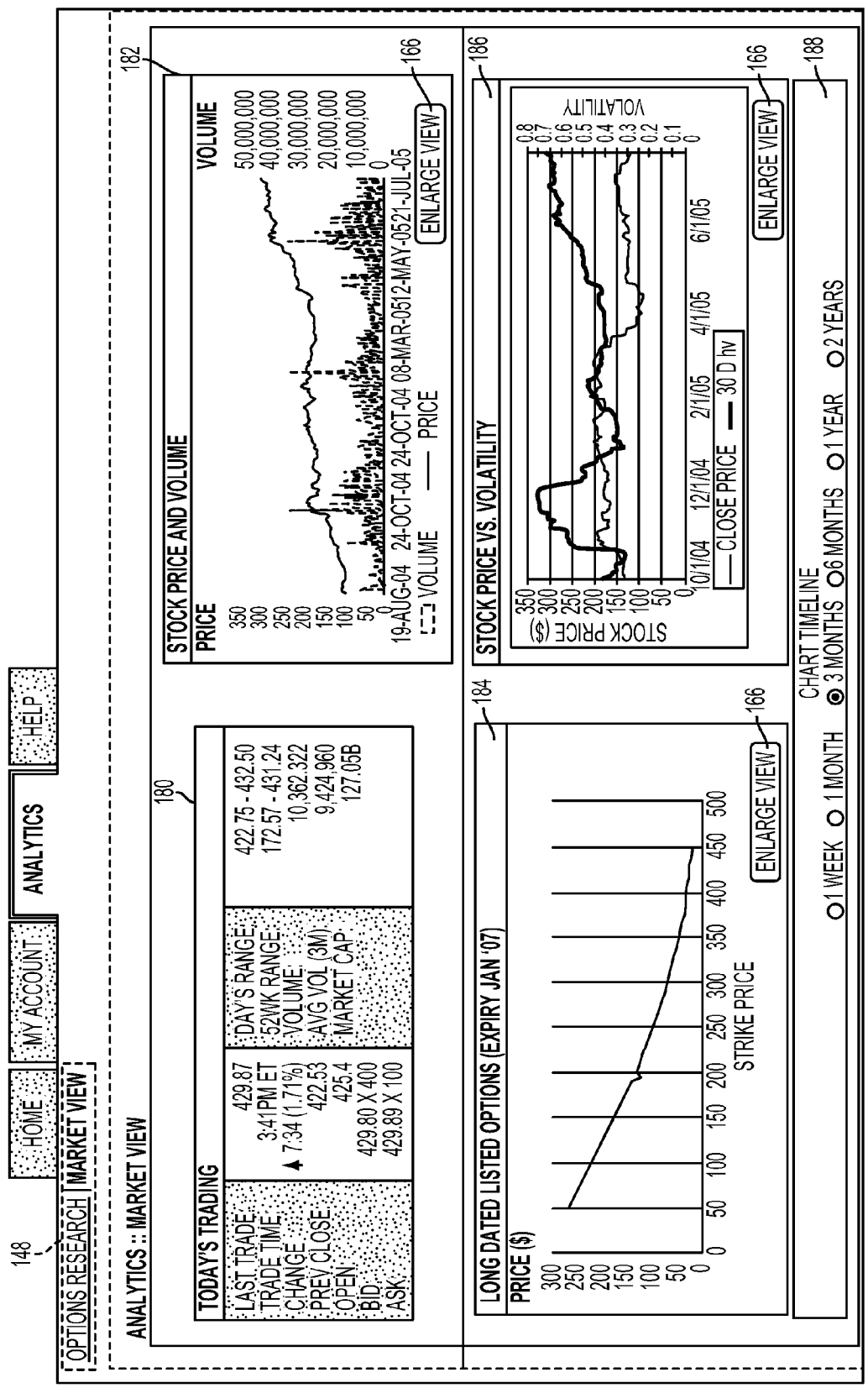

FIG. 12 is an example screen shot of a user interface that may be displayed to the employee when the "Market View" link in the field 148 is selected. This user interface may include a number of charts 180-186 that convey information about the issuer's stock. The first chart 180 may be a table that lists information about the present trading of the issuer's stock. The information may include the last trade price, the time of the last trade, the change in price, the previous closing price, price ranges over various time periods, trading volume, market capitalization, etc. The analytics engine 36 may obtain this information from the data feed 39 and/or a database.

A second chart 182 may chart the stock price and the volume traded for the issuer's stock over the selected time frame. A third chart 184 may show the price for long dated (e.g., expiration at least two years away) listed options for the issuer's stock versus the strike price for the options. A fourth chart 186 may depict the volatility in the stock price. In a chart timeline selection field 188, the employee can select the time period over which the market view metrics are to be shown in the graphs 182 and 186. In addition, like the "Options Research" interface of FIG. 10, some of the charts 180-186 may include an "Enlarge View" button 166, which, when activated by the user, may bring up an enlarged view of the selected graph.

According to various embodiments, the issuer 14 and/or entities acting on behalf of the issuer may also log into the transaction system 10 via the network 18 to view issuer-related analytics pertaining to the sales of the ESOs. The analytics may be determined by the analytics engine 36 based on, among other things, data stored in the databases 31-35 as well as data from the data feeds 39. FIGS. 13-21 are examples screen shots of user interfaces that the issuer 14 may access to view such issuer-related analytics pertaining to the sales of the ESOs.

Figure 13:
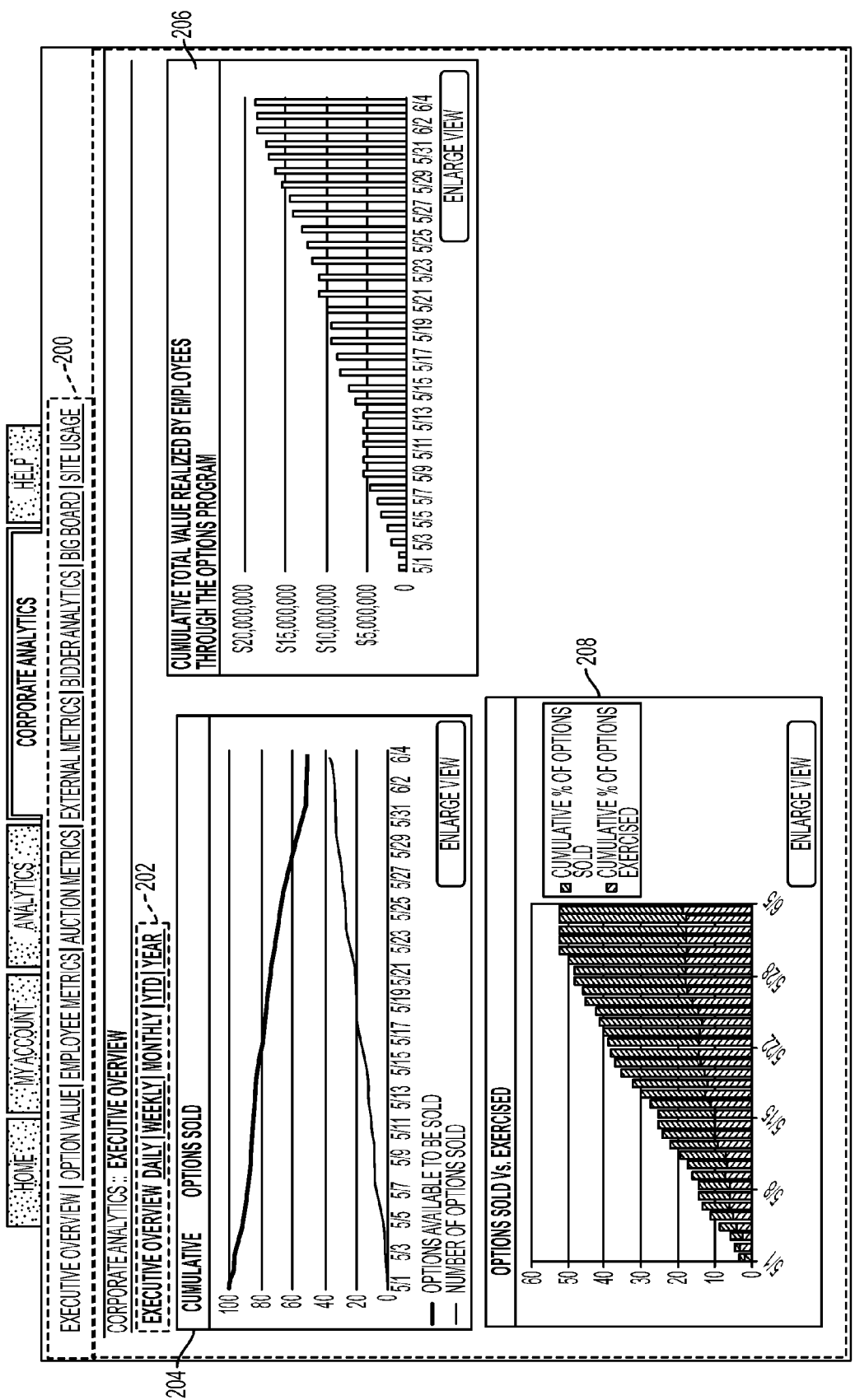

As shown in the example of FIG. 13, the issuer 14 may select which types of analytics to view from a menu field 200. According to various embodiments, possible options include an executive overview, analytics pertaining to the value of the ESOs, employee metrics, transaction metrics, external metrics, bidder analytics, and site usage. Of course, in other embodiments, different and/or additional types of analytics may be used.

FIG. 13 is an embodiment of an interface conveying executive overview information. In a time frame selection menu field 202, the user may select the desired time frame over which the transaction data is to be analyzed. The illustrated interface includes three charts (although in other embodiments, a different number of charts could be displayed). A first chart 204 may graph the number of ESOs available to be sold via the transaction system 10 (which is a function of the number of ESOs granted to employees that have vested) versus the number of options sold using the transaction system 10 over the selected time frame.

A second chart 206 may be a bar chart that shows the cumulative total value realized by employees through the ESO sale program. A third chart 208 may convey information to compare the cumulative percentage of options sold through the ESO sale program over the selected time period versus the cumulative percentage of options exercised by employees (that is, exercised' outside of the ESO sale program). In the illustrated embodiment, the chart 208 is a bar chart where the cumulative percentage of options exercised is at the bottom portion of the bars, and the cumulative percentage of options sold via the ESO sale program is on the upper portion of the bars. The two conditions may be demarcated by different colors or shading (as in the illustrated embodiment of FIG. 13) or by different hatching patterns. In other embodiments, different types of charts may be used to graphically convey this or similar information.

Figure 14:
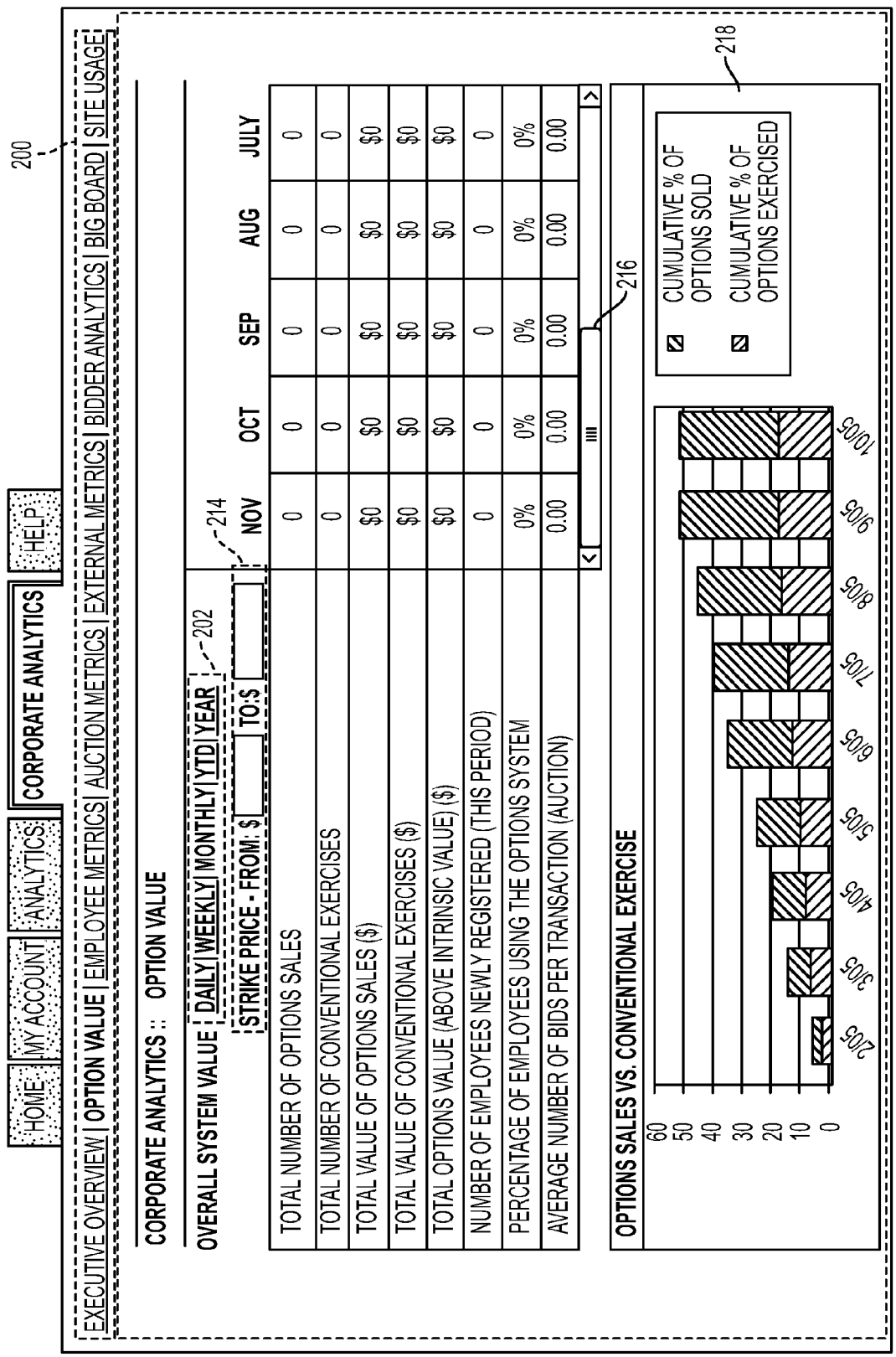

FIG. 14 is an example of an interface the issuer 14 may use to view information about the value of the ESOs. The issuer 14 may access the interface by selecting the "Option Value" link in the menu field 200. As shown in the illustrated embodiment, the interface may include two charts. The first chart 210 may be a table that displays information about the ESOs sold via the transaction system and those exercised outside of the ESO sale program. In a time period selection field 202 the user may select the desired time period, and in a strike price selection field 214 the user may select the range of strike prices for which the user wishes to review the data. According to various embodiments, per the selected time frame from selection field 202, the table may list the following data pertaining to the ESOs: the number of ESOs sold in the ESO sale program; the number of ESOs exercised outside of the ESO sale program; the total value of the ESO sales using the transaction system 10; the total value of the ESO exercised outside of the ESO sale program; the total value of the ESOs sold in the transaction system above their intrinsic value; the number of employees newly registered with the transaction system; the percentage of registered employees using the transaction system; and the average number of bids per transaction (e.g., per auction). Using a scroll bar 216, the user may scroll horizontally through the range of time periods.

The option value interface may also include, as shown in the illustrated embodiment of FIG. 14, a second chart 218 which conveys information to compare the cumulative percentage of options sold through the ESO sales program over the selected time period versus the cumulative percentage of options exercised by employees (that is, exercised outside of the ESO sales program). This chart may be similar to the chart 208 of FIG. 13, for example.

Figure 15:
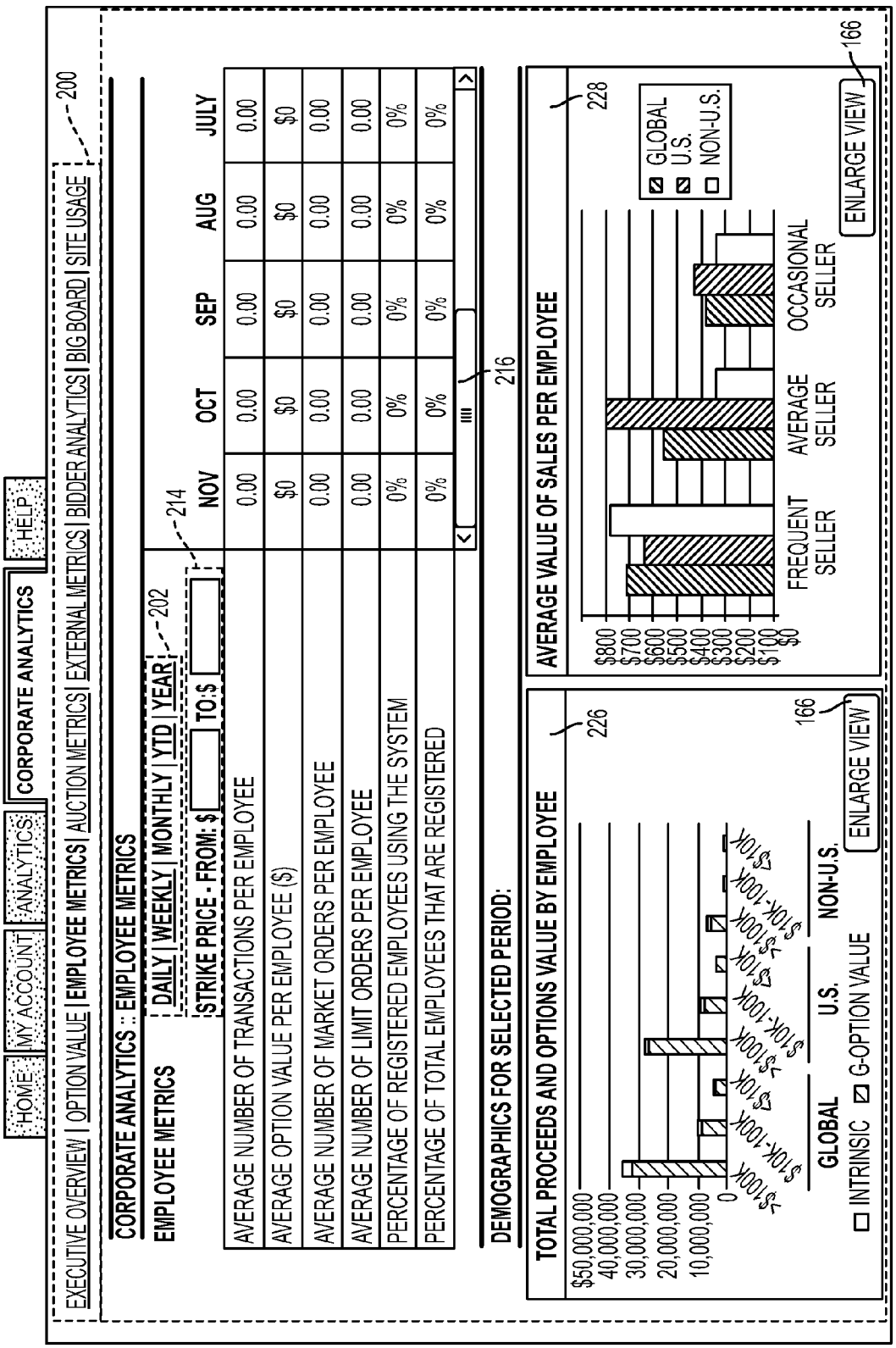

FIG. 15 is an example of an interface the issuer 14 may use to view employee metrics. The issuer 14 may access the interface by selecting the "Employee Metrics" link in the menu field 200. As shown in the illustrated embodiment, the interface may include three charts. The first chart 220 may be a table that displays information about employee usage of the ESO sales program. In a time period selection field 222 the user may select the desired time period, and in a strike price selection field 224 the user may select the range of strike prices for which the user wishes to review the data. According to various embodiments, per the selected time frame from selection field 222, the table may list the following data pertaining to employee usage of the ESO sales program: average number of transactions (e.g., sales through the ESO sales program) per employee; average option value per employee; average number of limit orders per employee; percentage of registered users using the ESO sales program; and percentage of total employees that are registered.

Charts 226 and 228 may convey demographic information about employee usage of the ESO sales program for the selected time period. The chart 216, for example, may be a bar chart that charts the total proceeds of the ESOs by employee, where the total proceeds include the intrinsic value of the ESOs and the premium gained through selling the ESOs through the ESO sales program. The intrinsic value may be shown at the bottom portion of the bars, and the premium may be shown on the upper portion of the bars. The two conditions may be demarcated by different colors, shading or hatching patterns, for example.

The chart 228 may be a bar chart that charts the average value of sales by employee. The employees may be segmented by usage of the transaction system (e.g., frequent, average, occasional) and/or by location.

Figure 16:
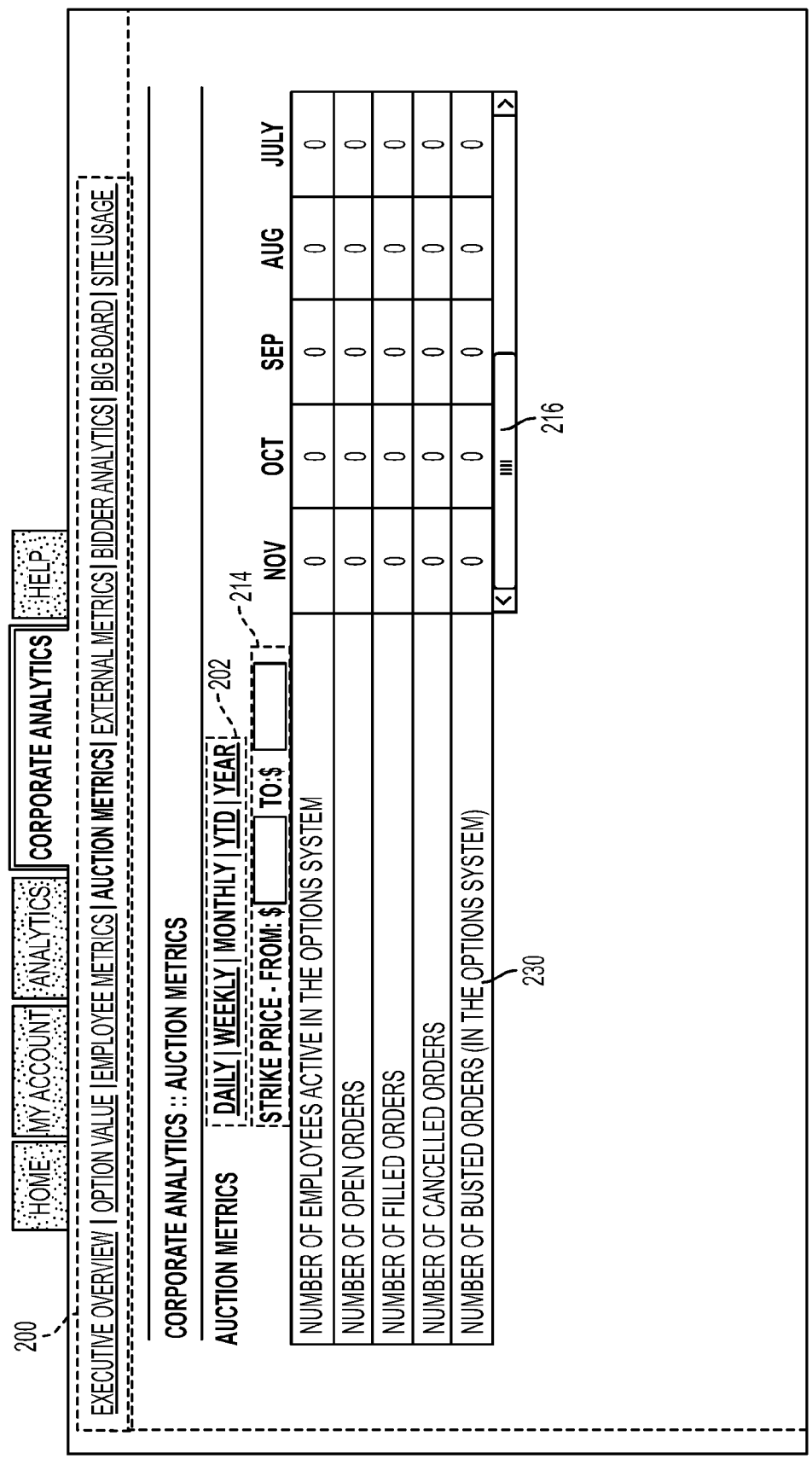

FIG. 16 is an example of an interface the issuer 14 may use to view transaction metrics. The issuer 14 may access the interface by selecting the "Transaction Metrics" link in the menu field 200. As shown in the illustrated embodiment, the interface may include a table 230 listing transaction-related information. According to various embodiments, per the selected time frame from selection field 222, the table 230 may list the following data pertaining to the ESO sales program: number of employees active in the transaction system; number of open orders; number of filled orders; number of cancelled orders; and number of busted orders. An order may be considered busted, for example, if it is detected that the employee also submitted an order to exercise the ESOs outside the ESO sales program.

Figure 17:
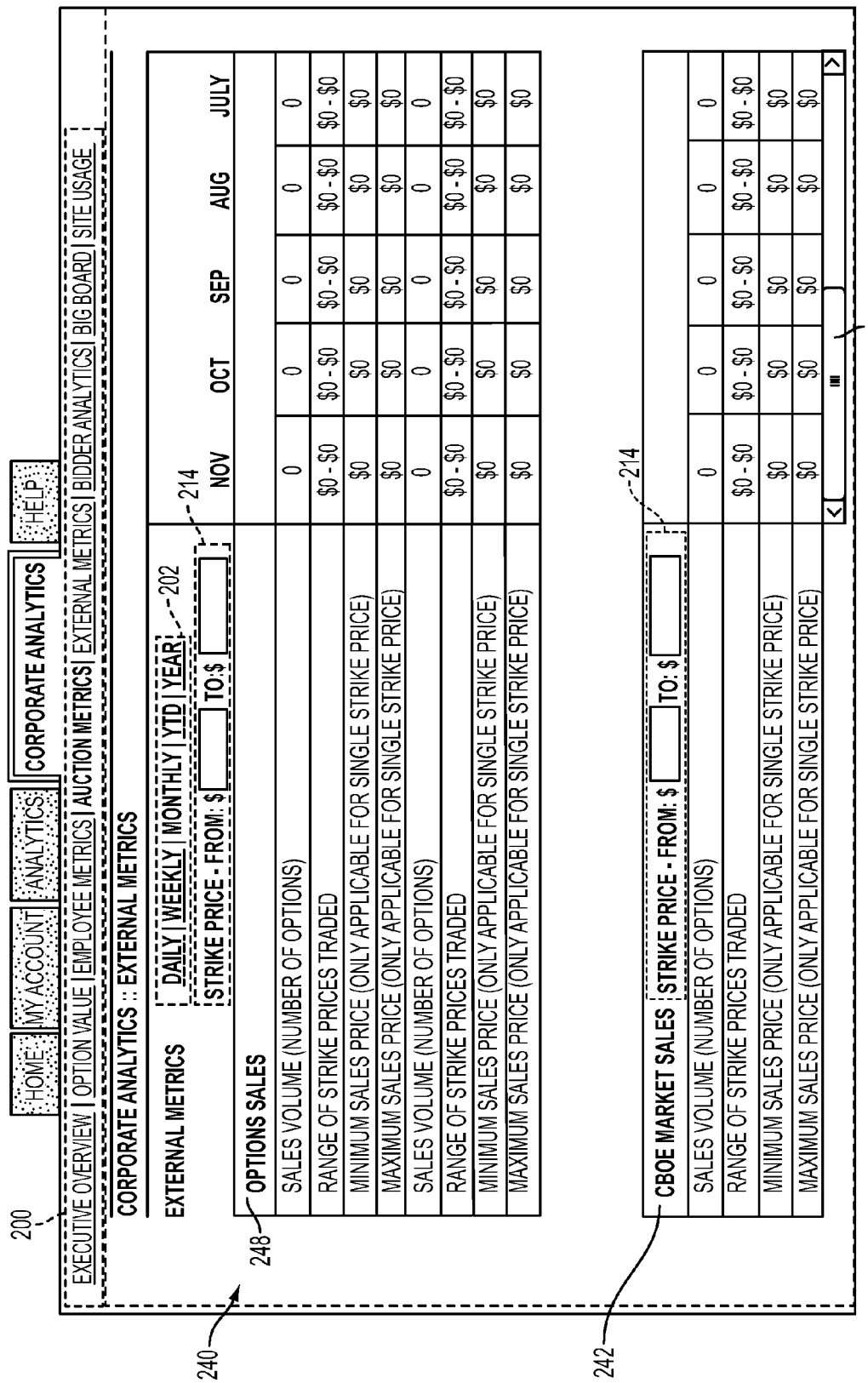

FIG. 17 is an example of an interface the issuer 14 may use to view metrics relating the external markets. The issuer 14 may access the interface by selecting the "External Metrics" link in the menu field 200. As shown in the illustrated embodiment, the interface may include tables 240, 242. Table 240 may list data regarding sales of the ESOs through the transaction system 10 and data regarding sales of ESOs by the plan administrator. According to various embodiments, the table 240 may include first and second portions 248, 249 that, per the time periods selected in the menu field 244, list the following data regarding sales of ESOs through the transaction system and sales by the plan administrator, respectively: sale volume (e.g., number of options); range of strike prices; minimum sales price; and maximum sales price.

The table 242 may list data regarding sales of nonemployee options for the issuer's stock. The sales data may be from an options exchange, such as the CBOE. The analytics engine 36 may receive the sales data for such nonemployee options from the data feed 39. According to various embodiments, the table 242 may list the same data for the nonemployee options sold on the options exchange as in the table 240.

Figure 18:
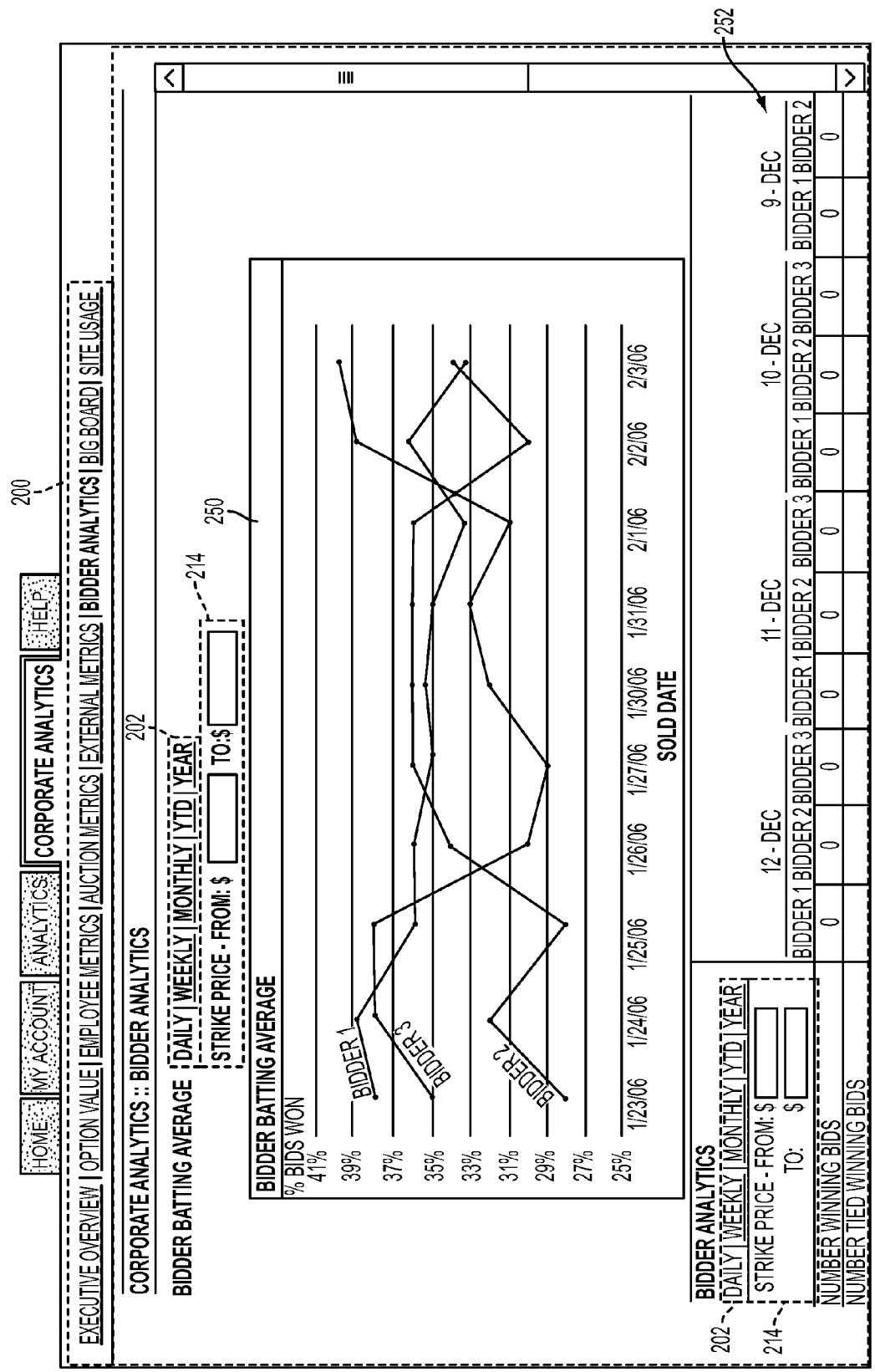

FIGS. 18 and 19 illustrate an example of an interface the issuer 14 may use to view bidder analytics. The issuer 14 may access the interface by selecting the "Bidder Analytics" link in the menu field 200. As shown in the illustrated embodiment, the interface may include a chart 250 showing the success ratio of various bidders (or "Batting Average"). In the illustrated example, the chart 250 shows that Bidder 1 won between about 33% and 39% of the transactions over the selected time frame, Bidder 2 won between about 28% and 36% of the transactions, and Bidder 3 won between about 29% and 40% of the transactions.

The bidder analytics interface may include a second chart 252 (shown better in FIG. 19) that may be a table that, according to various embodiments, may list, per the selected time periods and per bidder, the following data: number of winning bids; number of tied bids; number of bids won by $0.05 to $0.10, the number won by $0.15 to $0.50, the number won by $0.55 to $1.00, and the number won by more than $1.00; number of bids lost by $0.05 to $0.10, the number lost by $0.15 to $0.50, the number lost by $0.55 to $1.00, and the number lost by more than $1.00; when losing, the average percentage off from the winning bid; the cumulative position of each bidder (in dollars); the lowest daily quoted price over the intrinsic value; the highest daily quoted price over the intrinsic value; and the end of day daily quoted price.

FIG. 20 is an example of an interface the issuer 14 may use to view an overview of the transactions. The issuer 14 may access the interface by selecting the "Big Board" link in the menu field 200. As shown in the illustrated embodiment, the interface may include a chart 260 that lists various transaction-related data for ESOs at different strike prices. The transaction-related data may include: the option expiration; the indicative price (e.g., the current highest bid, as of the time when the auction data was last compiled); the relative change (e.g., the change in price from a prior auction, such as the last auction on the previous day or the immediately preceding auction); the winning bidder; and ranges of bids.

Figure 21:
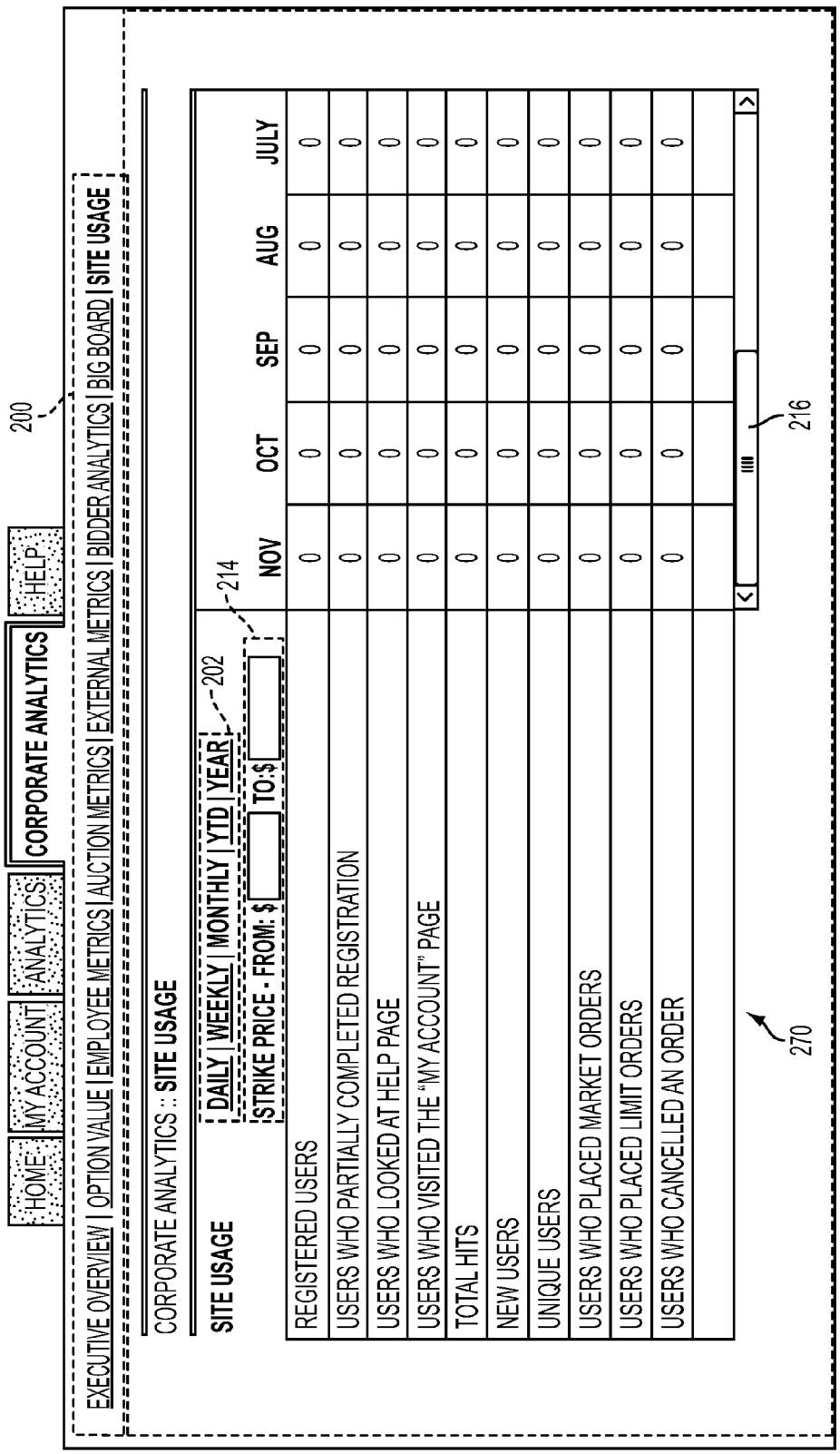

FIG. 21 is an example of an interface the issuer 14 may use to view statistics related to usage of the transaction system. The issuer 14 may access the interface by selecting the "Site Usage" link in the menu field 200. As shown in the illustrated embodiment, the interface may include a chart 270. The chart 270 may be a table that, per the selected time periods, lists various data regarding usage of the transaction system, including, for example: number of registered users; users who have partially completed registration; users who looked at the help page; users who visited certain pages; total hits; new users; unique users; users who placed market orders; users who placed limit orders; users who cancelled an order, etc.

According to various embodiments, the bidders 16 may also log into the transaction system 10 via the network 18 to view bidder-related analytics pertaining to the transactions for the ESOs. For example, according to various embodiments, a bidder 16 may access charts like the charts 250, 252 of FIG. 18, although the charts served to the bidders may, for example, only contain data with respect to the particular bidder accessing the analytics, and not the data for other bidders.

As used herein, the term "engine" refers to one or more processors that execute computer software code which, when executed by the processor(s), cause the processor(s) to perform the particular function of the engine. The code may be stored on a computer readable medium.

While several embodiments of the present invention have been described herein, it should be apparent that various modifications, alterations and adaptations to those embodiments may occur to persons skilled in, the art. For example, certain steps of the processes described above may be performed in different orders and/or simultaneously. Also, the illustrated screen shots are merely exemplary of types of information and how information may be displayed to different end users. It is therefore intended to cover all such modifications, alterations and adaptations without departing from the scope and spirit of the present invention as defined by the appended claims.

What is claimed is:

1. A computer implemented method for auctioning compensation instruments issued by an issuer, the method comprising:

receiving, by a computer-based automated transaction system, via, an electronic data communications network, sell orders for a plurality of sellers, where, in each sell order is an order to sell a quantity of a specified compensation instrument issued by the issuer to the seller, wherein exercise of the compensation instrument by the seller entitles the seller to an underlying financial, security, wherein the automated transaction system comprises at least one computerized transaction engine that implements auction transactions in connection with the specified compensation instrument, wherein the computerized transaction engine comprises at least one processor that executes instructions stored on a computer readable medium; and wherein the sell orders are processed by the transaction: system in a received time order;

receiving, by the transaction system, via a plurality of electronic communication links, a plurality of bids from a plurality of computer-based automated bid systems each associated with one of a plurality of bidders, wherein each of the plurality of bids is for a product corresponding to the specified compensation instrument and indicates a bid price and a bid quantity, wherein the transaction engine adds the bids to its book in order to execute the auction transactions and wherein when the auction for a pending sell order is won by a winning bid, the transaction system is configured m decrement the bid quantity of the winning bid by an amount corresponding to the quantity of the pending sell order;

determining for each of the auction transactions, by the transaction system, whether each of the bids is a qualifying bid comprising at least verifying that the bids are either (i) at or above a predetermined minimum bid quantity, or (ii) at or above the bid quantity for the pending sell order where a pending bid is below the predetermined minimum bid quantity because the transaction system decremented the pending bid due to the pending bid having won a prior auction; transaction;

determining for each of the auction transactions, by the transaction system, whether there are at least a predetermined required plurality of qualifying bids, and if not then suspending the auction transaction;

determining for a suspended auction transaction, by the transaction system, when there are at least the predetermined required plurality of qualifying bids, in determining when there are at least the predetermined required plurality of qualifying bids for the suspended auction, one or more automated bid system bids below the predetermined minimum bid quantity due to decrementing of bid quantity associated with one or more prior auction transactions are enabled to count toward the predetermined required plurality of qualifying bids and are enabled to participate as one or more active auction bids, even prior to the one or more automated bid systems refreshing the one or more automated bid system bids to at least the predetermined minimum bid quantity; and upon a determination that there, are at least the predetermined required plurality of qualifying bids proceeding with the suspended auction transaction by the transaction system wherein proceeding with the suspended auction transaction comprises:

determining a winning highest bid among the qualifying bids; and decrementing the bid quantity of the winning highest bid.

2. The method of claim 1, wherein the compensation instruments comprise employee stock options.

3. The method of claim 1, wherein the transaction system comprises a plurality of transaction engines, wherein received sell orders are for a plurality of specified compensation instruments, wherein received bids are for a plurality of products corresponding to a plurality of specified compensation instruments, and wherein each of the plurality of transaction engines implement auctions for different groupings of the products, the method further comprising:

providing, by the transaction system, the received sell orders to the appropriate transaction engines based on the specified compensation instrument of the sell order, whereby the auctions for different groupings of products are executed in parallel.

4. The method of claim 1, further comprising:
sending, by the transaction system, a listing of the products available for bidding to the automated bid systems, wherein the listing provides an indication of strike price and strike date for each available compensation instrument.

5. The method of claim 4, further comprising:
receiving, by the transaction system, a bid file from each automated bid system, the bid file indicating bids for a plurality of specified products, wherein the bids include a bid quantity and a bid price.

6. The method of claim 5, wherein the bid file from each automated bid system comprises a bid for all products in the listing sent to the automated bid systems.

7. The method of claim 1, wherein the transaction system is configured to limit the quantity of the specified compensation instrument that a seller can sell in a single auction transaction for the specified compensation instrument, wherein the limit is a predetermined maximum number, and wherein the transaction system is configured to permit multiple pending sell orders for the seller for the specified compensation instrument even where the aggregate number of the specified compensation instrument for sale across the multiple pending seller orders for the seller exceeds the predetermined maximum number, the method further comprising:
permitting, by the transaction system, multiple pending sell orders for the seller corresponding to the specified compensation instrument even where in the aggregate greater than the predetermined maximum number are offered; and
not permitting, by the transaction system, a single auction for the specified compensation instrument where greater than the predetermined maximum number are offered.

8. The method of claim 7, wherein the predetermined maximum number equals the predetermined minimum bid quantity.

9. The method of claim 1, wherein the transaction system is configured to accept bids from the automated bid systems where the bid quantity is a predetermined minimal bid quantity, and wherein the step of determining whether there are at least a predetermined required plurality of qualifying bids, and if not then suspending the auction transaction, further comprises:
excluding any bid having the predetermined minimal bid quantity when determining whether there are at least the predetermined required plurality of qualifying bids.

10. The method of claim 9, wherein the predetermined minimal bid quantity is zero.

11. The method of claim 9, wherein there is a predetermined minimal bid price of one cent for the bids.

12. A system for auctioning compensation instruments issued by an issuer, the transaction system comprising:
a computer-based transaction system comprising at least one transaction engine, wherein the at least one transaction engine comprises at least one processor for executing software code stored on a computer readable medium, wherein file transaction, system is programmed to:
receive, via an electronic data communications network, sell orders from a plurality of sell orders, wherein each sell order is an order to sell a quantity of a specified compensation instrument issued by the issuer to the seller, wherein exercise of the compensation instrument by the seller entitles the seller to an underlying financial security, and wherein, when the at least, one transaction engine executes the software code, the transaction, engine implements auction transactions in connection with the specified compensation instrument, and wherein the sell orders are processed by the transaction system in a received time order;
receive, via a plurality of electronic communication links, a plurality of bids from a plurality of computer-based automated bid systems each associated with one of a plurality of bidders, wherein each of the plurality of bids is for a product corresponding to the specified compensation instrument and indicates a bid price and a bid quantity, wherein the transaction system adds the bids to its book in order m execute the auction transactions, and wherein when the auction for a pending sell order is won by a winning bid, the transaction system is configured to decrement the bid quantity of the winning bid by an amount corresponding to the quantity of the pending sell order;
determine for each of the auction transactions whether each of the bids is a qualifying bid by at least verifying that the bids are either (i) at or above a predetermined minimum bid quantity, or (ii) at or above the bid quantity for the pending sell order where a pending bid is below the predetermined minimum bid quantity because the transaction system decremented the pending bid due to the pending bid having won a prior auction transaction;
determine for each of the auction transactions whether there am at least a predetermined required plurality of qualifying bids, and if not then suspending the auction transaction;
determine for a suspended auction transaction when there are at least the predetermined required plurality of qualifying bids, in determining when there are at least the predetermined required plurality of qualifying bids for the suspended auction, one or more automated bid systems below the predetermined minimum bid quantity due to decrementing of bid quantity associated with one or more prior auction transactions are enabled to count towards the predetermined required plurality of qualifying bids and are enabled to participate as one or more active auction bids, even prior to the one or more automated bid systems refreshing the one or more automated bid system bids at least the predetermined minimum bid quantity; and
upon a determination that there are at least the predetermined required plurality of qualifying bids, proceeding with the suspended auction transaction, wherein proceeding with the suspended auction transaction comprises:
determining a winning highest bid among the qualifying bids; and
decrementing the bid quantity of the winning highest bid.

13. The system of claim 12, wherein the compensation instruments are employee stock options.

14. The system of claim 12, wherein the transaction system comprises a plurality of transaction engines, wherein received sell orders are for a plurality of specified compensation instruments, wherein received bids are for a plurality of products corresponding to a plurality of specified compensation instruments, and wherein each of the plurality of transaction engines implement auctions for different groupings of the products, and wherein the system further comprises a router for providing the received sell orders to the appropriate transaction engines based on the specified compensation instrument of the sell order, whereby the auctions for different groupings of products are executed in parallel.

15. The system of claim 12, wherein the transaction engine system is programmed to send a listing of the products available for bidding to the automated bid systems, wherein the listing provides an indication of strike price and strike date for each available compensation instrument.

16. The system of claim 15, wherein the transaction system is programmed to receive a bid file from each automated bid system, the bid file indicating bids for a plurality of specified products, wherein the bids include a bid quantity and a bid price.

17. The system of claim 16, wherein the bid file from each automated bid system comprises a bid for all products in the listing sent to the automated bid systems.

18. The system of claim 12, wherein the transaction system is configured to limit the quantity of the specified compensation instrument that a seller can sell in a single auction transaction for the specified compensation instrument, wherein the limit is a predetermined maximum number, and wherein the transaction system is configured to permit multiple pending sell orders for the seller for the specified compensation instrument even where the aggregate number of the specified compensation instrument for sale across the multiple pending seller orders for the seller exceeds the predetermined maximum number, and wherein the transaction system permits multiple pending sell orders for the seller corresponding to the specified compensation instrument even where in the aggregate greater than the predetermined maximum number are offered, and does not permit a single auction for the specified compensation instrument where greater than the predetermined maximum number are offered.

19. The system of claim 18, wherein the predetermined maximum number equals the predetermined minimum bid quantity.

20. The system of claim 12, wherein the transaction system is configured to accept bids from the automated bid systems where the bid quantity is a predetermined minimal bid quantity, and wherein the transaction system is programmed to determine whether there are at least a predetermined required plurality of qualifying bids, and if not then suspends the auction transaction, by excluding any bid having the predetermined minimal bid quantity when determining whether there are at least the predetermined required plurality of qualifying bids.

21. The system of claim 20, wherein the predetermined minimal bid quantity is zero.

22. The system of claim 20, wherein there is a predetermined minimal bid price of one cent for the bids.

* * * * *